(12) United States Patent
Orihara et al.

(10) Patent No.: US 12,409,666 B2
(45) Date of Patent: Sep. 9, 2025

(54) INK JET PRINTING METHOD, INK JET PRINTING APPARATUS, METHOD OF PRODUCING POROUS BODY, AND APPARATUS FOR PRODUCING POROUS BODY

(71) Applicant: CANON KABUSHIKI KAISHA, Tokyo (JP)

(72) Inventors: Tatsuaki Orihara, Tokyo (JP); Kenji Shinjo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 18/193,741

(22) Filed: Mar. 31, 2023

(65) Prior Publication Data
US 2023/0256753 A1    Aug. 17, 2023

Related U.S. Application Data

(63) Continuation of application No. PCT/JP2021/037308, filed on Oct. 8, 2021.

(30) Foreign Application Priority Data

| Oct. 8, 2020 | (JP) | 2020-170532 |
| Oct. 8, 2020 | (JP) | 2020-170533 |
| Oct. 8, 2020 | (JP) | 2020-170535 |

(51) Int. Cl.
*B41J 11/00* (2006.01)
*B41J 2/005* (2006.01)
(Continued)

(52) U.S. Cl.
CPC ....... *B41J 11/00214* (2021.01); *B41J 2/0057* (2013.01); *C09D 11/38* (2013.01); *B41J 2002/012* (2013.01)

(58) Field of Classification Search
CPC ....... C09D 11/101; C09D 11/38; C09D 11/30; C09D 11/00; C09D 5/4411;
(Continued)

(56) References Cited

U.S. PATENT DOCUMENTS

| 5,432,245 A * | 7/1995 | Roberts ................. C08F 220/54 |
| | | 526/287 |
| 7,503,649 B2 | 3/2009 | Kishi |

(Continued)

FOREIGN PATENT DOCUMENTS

| CN | 1918249 A | 2/2007 |
| CN | 107107461 A | 8/2017 |

(Continued)

OTHER PUBLICATIONS

International Preliminary Report on Patentability for International Patent Application No. PCT/JP2021/037308 dated Apr. 20, 2023 (translation).

(Continued)

*Primary Examiner* — John Zimmermann
(74) *Attorney, Agent, or Firm* — Venable LLP

(57) ABSTRACT

Provided is an ink jet printing method including: a first step of ejecting an ink containing a water-soluble polymerizable component A and water from a printing head of an ink jet system to apply the ink to a medium M, to thereby form a first image; and a second step of applying an active energy ray to the first image to form a second image. The polymerizable component A is dissolved in the first image, and a moisture concentration "x" (mass %) in the first image and a moisture concentration "y" (mass %) in the second image placed under an environment at a humidity of 95% satisfy a relationship of $0<(y/x)\leq 0.80$.

21 Claims, 6 Drawing Sheets

(51) Int. Cl.
*C09D 11/38* (2014.01)
*B41J 2/01* (2006.01)

(58) Field of Classification Search
CPC ............ B41J 11/0015; B41J 11/00214; B41M 7/0081; B41M 7/00; C08F 222/385; G03C 1/053
See application file for complete search history.

(56) References Cited

U.S. PATENT DOCUMENTS

| | | |
|---|---|---|
| 7,976,148 B2 | 7/2011 | Kishi |
| 8,378,002 B2 | 2/2013 | Kyota |
| 8,690,306 B2 | 4/2014 | Amao |
| 8,905,534 B2 | 12/2014 | Amao |
| 9,169,412 B2 | 10/2015 | Amao |
| 10,711,149 B2 | 7/2020 | Kiyosada |
| 10,882,340 B2 | 1/2021 | Orihara |
| 2004/0160499 A1 | 8/2004 | Ishikawa |
| 2006/0004116 A1 | 1/2006 | Kishi |
| 2009/0136680 A1 | 5/2009 | Kishi |
| 2010/0015360 A1 | 1/2010 | Kyota |
| 2012/0249700 A1 | 10/2012 | Amao |
| 2013/0038668 A1* | 2/2013 | Kaga ..................... C09D 11/38 347/102 |
| 2014/0132685 A1 | 5/2014 | Amao |
| 2015/0210876 A1 | 7/2015 | Amao |
| 2018/0291219 A1 | 10/2018 | Kiyosada |
| 2019/0001301 A1* | 1/2019 | Ishikura ............... B41J 11/0015 |
| 2020/0114664 A1 | 4/2020 | Orihara |
| 2020/0130356 A1 | 4/2020 | Orihara |
| 2020/0283647 A1* | 9/2020 | Yasuhara ............. C09D 201/02 |
| 2022/0112385 A1 | 4/2022 | Shinjo |

FOREIGN PATENT DOCUMENTS

| | | |
|---|---|---|
| CN | 110831776 A | 2/2020 |
| EP | 1734088 A1 | 12/2006 |
| EP | 2145932 A1 | 1/2010 |
| EP | 3251818 A1 | 12/2017 |
| EP | 3626469 A1 | 3/2020 |
| JP | 2000117960 A | 4/2000 |
| JP | 2004263175 A | 9/2004 |
| JP | 2005307199 A | 11/2005 |
| JP | 2005313558 A | 11/2005 |
| JP | 2010024276 A | 2/2010 |
| JP | 2011020377 A | 2/2011 |
| JP | 2012111822 A | 6/2012 |
| JP | 2012214561 A | 11/2012 |
| JP | 2013018846 A | 1/2013 |
| JP | 2013223960 A | 10/2013 |
| JP | 2016147998 A | 8/2016 |
| JP | 2019010872 A | 1/2019 |
| JP | 2019010873 A | 1/2019 |
| KR | 20170108962 A | 9/2017 |
| KR | 20200020861 A | 2/2020 |
| WO | 2005092994 A1 | 10/2005 |
| WO | 2014041940 A1 | 3/2014 |
| WO | 2014237741 A | 12/2014 |
| WO | 2016121587 A1 | 8/2016 |
| WO | 2019004397 A1 | 1/2019 |
| WO | 2019004428 A1 | 1/2019 |
| WO | 2022075440 A1 | 4/2022 |

OTHER PUBLICATIONS

International Search Report and Written Opinion for International Patent Application No. PCT/JP2021/037308 dated Sep. 12, 2021.

* cited by examiner

SPINODAL CURVE

INK JET PRINTING METHOD, INK JET PRINTING APPARATUS, METHOD OF PRODUCING POROUS BODY, AND APPARATUS FOR PRODUCING POROUS BODY

CROSS-REFERENCE TO RELATED APPLICATIONS

This application is a Continuation of International Patent Application No. PCT/JP2021/037308, filed Oct. 8, 2021, which claims the benefit of Japanese Patent Applications No. 2020-170532, filed Oct. 8, 2020, No. 2020-170535, filed Oct. 8, 2020, and No. 2020-170533, filed Oct. 8, 2020, all of which are hereby incorporated by reference herein in their entirety.

BACKGROUND OF THE INVENTION

Field of the Invention

The present invention relates to an ink jet printing method, an ink jet printing apparatus, a method of producing a porous body, and an apparatus for producing a porous body.

Description of the Related Art

In a liquid-based image printing apparatus typified by an ink jet printing apparatus, a printing method including using an ink that is cured by an active energy ray, such as ultraviolet light or an electron beam, has been proposed and put into practical use. The ultraviolet light is often used as the active energy ray for curing the ink. The application of the ultraviolet light polymerizes a polymerizable component in the ink to form a cured product, and hence an image having high fastness can be obtained even immediately after printing.

However, in an ultraviolet light (UV)-curable ink, most of its ink components are cured, and hence the surface heights of an image to be formed are liable to differ from each other depending on the application amount of the ink. Accordingly, it is often difficult to uniformize a printed surface. In addition, the viscosity of an ink to be ejected from a printing head of an ink jet system needs to be reduced, and hence it is important to incorporate a large amount of a low-viscosity component (low-viscosity UV monomer) that can be cured by ultraviolet light into the ink. Meanwhile, the low-viscosity UV monomer is volatile and liable to emit an odor, and hence many such monomers raise concern about influences on an environment and the like.

In contrast, an aqueous UV-curable ink using water as a component for diluting a polymerizable component has been proposed. The diluting component of the aqueous UV-curable ink is water, and hence in the resultant image, a difference between the surface heights of the image due to a difference in application amount of the ink hardly occurs. Accordingly, a printed surface is easily uniformized. In addition, the aqueous UV-curable ink has high safety and a small influence on an environment. In, for example, Japanese Patent Application Laid-Open No. 2000-117960, there is a proposal of an ink jet printing method including using an aqueous UV-curable ink containing water and a water-soluble polymerizable component. In addition, in Japanese Patent Application Laid-Open No. 2011-020377, there is a proposal of an ink jet printing method including: heating an image formed with an aqueous UV-curable ink to remove water in the ink; and then applying ultraviolet light to the heated image.

In addition, when an image is formed with an ultraviolet light-curable ink, the surface of the image formed on a printing medium is not smoothed in some cases, and the glossiness of the image has sometimes reduced owing to the fact. To cope with such problem, in Japanese Patent Application Laid-Open No. 2005-313558, there is a proposal of an ink jet printing method in which the surface of an image is smoothed by adjusting a time period from the application of an ultraviolet light-curable ink to a printing medium to the application of ultraviolet light to the ink, and hence an image having high glossiness can be formed.

However, the aqueous UV-curable ink to be used in the ink jet printing method proposed in Japanese Patent Application Laid-Open No. 2000-117960 forms a gelled cured product holding moisture. Accordingly, it is difficult to remove the moisture from the cured product, and there has been a problem in that curling is liable to occur in a printed product to be obtained because the cured product contracts along with its drying. Such problem has been liable to manifest itself particularly when the application amount of the ink is large.

In addition, in the ink jet printing method proposed in Japanese Patent Application Laid-Open No. 2011-020377, after the application of the ink to a printing medium, the ink is dried and then irradiated with ultraviolet light, and hence the ink cannot be pinned by being irradiated with the ultraviolet light immediately after the application of the ink. Accordingly, there has been a problem in that so-called bleeding in which when an image is printed with inks of a plurality of colors, the colors mix with each other in the image is liable to occur.

In addition, the ink jet printing method described in Japanese Patent Application Laid-Open No. 2005-313558 can control the surface shape of an image to be formed on a printing medium. However, the film of the formed image is a solid film having no pores therein, and hence it has been impossible to form the film of an image having a porous structure. Further, as in Japanese Patent Application Laid-Open No. 2005-313558, in each of the ink jet printing methods described in Japanese Patent Application Laid-Open No. 2000-117960 and Japanese Patent Application Laid-Open No. 2011-020377, it has been impossible to form the film of an image having a porous structure.

Accordingly, an object of the present invention is to provide an ink jet printing method, in which an active energy ray-curable aqueous ink is used, moisture is easily removed from a cured product thereof and a printed product to be obtained hardly curls, and even when inks of a plurality of colors are used, bleeding hardly occurs. Further, an object of the present invention is to provide an ink jet printing apparatus to be used in the ink jet printing method.

In addition, an object of the present invention is to provide a method of producing a porous body and an apparatus for producing a porous body each enabling on-demand production of a porous body having a desired free shape.

SUMMARY OF THE INVENTION

That is, according to one aspect of the present invention, there is provided an ink jet printing method including: a first step of ejecting an ink containing a water-soluble polymerizable component A and water from a printing head of an ink jet system to apply the ink to a medium M, to thereby form a first image; and a second step of applying an active energy ray to the first image to form a second image, wherein the polymerizable component A is dissolved in the first image, and wherein a moisture concentration "x" (mass %) in the first image and a moisture concentration "y" (mass %) in the second image placed under an environment at a humidity of 95% satisfy a relationship of 0<(y/x)≤0.80.

According to another aspect of the present invention, there is provided an ink jet printing apparatus including: a unit configured to perform a first step of ejecting an ink containing a water-soluble polymerizable component A and water from a printing head of an ink jet system to apply the ink to a medium M, to thereby form a first image; and a unit configured to perform a second step of applying an active energy ray to the first image to form a second image, wherein the polymerizable component A is dissolved in the first image, and wherein a moisture concentration "x" (mass %) in the first image and a moisture concentration "y" (mass %) in the second image placed under an environment at a humidity of 95% satisfy a relationship of 0<(y/x)≤0.80.

According to still another aspect of the present invention, there is provided a method of producing a porous body including: a first step of ejecting a liquid composition containing a water-soluble polymerizable component A and water from a printing head of an ink jet system to apply the liquid composition to a medium M, to thereby form a first film; and a second step of applying an active energy ray to the first film to form a second film having a porous structure, wherein the polymerizable component A is dissolved in the first film, and wherein a moisture concentration "x" in the first film and a moisture concentration "y" in the second film placed under an environment at a humidity of 95% satisfy a relationship of 0<(y/x)≤0.80.

According to yet still another aspect of the present invention, there is provided an apparatus for producing a porous body including: a unit configured to perform a first step of ejecting a liquid composition containing a water-soluble polymerizable component A and water from a printing head of an ink jet system to apply the liquid composition to a medium M, to thereby form a first film; and a unit configured to perform a second step of applying an active energy ray to the first film to form a second film having a porous structure, wherein the polymerizable component A is dissolved in the first film, and wherein a moisture concentration "x" in the first film and a moisture concentration "y" in the second film placed under an environment at a humidity of 95% satisfy a relationship of 0<(y/x)≤0.80.

Further features of the present invention will become apparent from the following description of exemplary embodiments with reference to the attached drawings.

DESCRIPTION OF THE EMBODIMENTS

Figure 1:
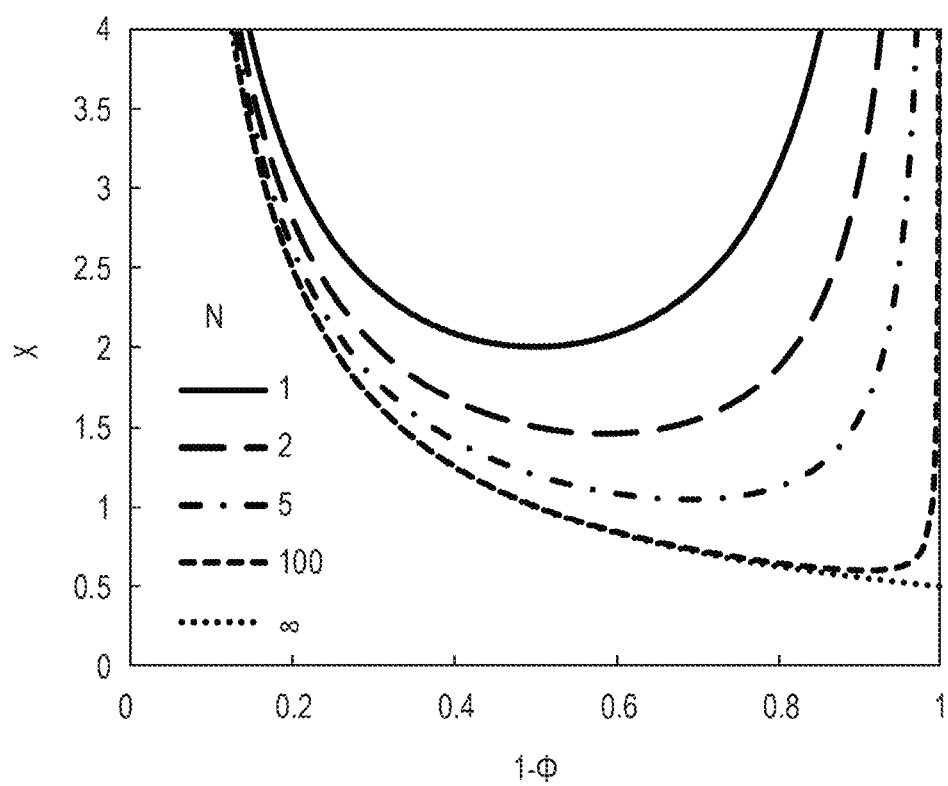
FIG. 1 is a phase diagram (graph) for showing a spinodal curve.

The present invention is described in more detail below by way of exemplary embodiments. In addition, an aqueous ink for ink jet is sometimes referred to simply as "ink". Physical property values are values at normal temperature (25° C.), unless otherwise stated.

<Ink Jet Printing Method>

An ink jet printing method according to one aspect of the present invention includes: a first step of forming a first image; and a second step of forming a second image. In the first step, an ink containing a water-soluble polymerizable component A and water is ejected from a printing head of an ink jet system to be applied to a medium M, to thereby form the first image. At this time, the polymerizable component A is dissolved in the first image. In addition, in the second step, an active energy ray is applied to the first image formed in the first step to form the second image. In addition, a moisture concentration "x" (mass %) in the first image and a moisture concentration "y" (mass %) in the second image placed under an environment at a humidity of 95% satisfy a relationship of 0<(y/x)≤0.80. Details about the ink jet printing method according to one aspect of the present invention are described below.

In the ink jet printing method according to one aspect of the present invention, the fact that the following so-called polymerization solid-liquid separation occurs is utilized: when the active energy ray is applied to the first image printed with the aqueous ink containing the water-soluble polymerizable component A to polymerize the component, the image undergoes a solid-liquid separation into a solid cured product and moisture. As a result of the occurrence of the polymerization solid-liquid separation, the gelation of the image is suppressed, and hence it becomes easier to remove the moisture from the second image that is the cured product. In addition, the curling of a printed product along with its drying can be suppressed.

According to the Flory-Huggins equation or the Flory-Rehner equation, the osmotic pressure of a polymer solution or gel is affected by the molecular weight and crosslinking density thereof, and a χ parameter representing an interaction between the solute and solvent thereof. Those values are represented by the following equation in a unified manner in the form of Tanaka's equation.

$$\Pi = \frac{n_p k_B T}{V_0}\left\{\frac{\phi}{2\phi_0} - \left(\frac{\phi}{\phi_0}\right)^{1/3}\right\} - \frac{k_B T}{V_c}\left\{\ln(1-\phi) + \left(1 - \frac{1}{N}\right)\phi + \chi\phi^2\right\} + \frac{f n_p \phi k_B T}{V_0 \phi_0}$$

In the equation, Π represents the osmotic pressure, $k_B$ represents Boltzmann's constant, T represents the absolute temperature of the polymer solution or the gel, $V_0$ represents the volume thereof in a reference state, $V_c$ represents the volume of one lattice in lattice theory, $\phi_0$ represents the volume fraction of the polymer at the time of its loading, $\phi$ represents the volume fraction of the polymer, and $n_p$ represents the total number of polymer chains between crosslinking points. In addition, N represents the length of the polymer, "f" represents the number of the ionic groups of one polymer chain between the crosslinking points, and χ represents a parameter representing the interaction between the two components. Herein, the osmotic pressure is the osmotic pressure of the polymer solution or the gel, and a positive osmotic pressure means that the solution or the gel has such a property as to further suck the solvent, while a negative osmotic pressure means that the solution or the gel has such a property as to expel the solvent. Although the term "polymer" is conventionally used, a molecular weight parameter is incorporated into the equation, and hence the equation is also substantially applicable to a low-molecular weight substance. In addition, a difference between the polymer solution and the gel is whether or not crosslinkages are present in a certain amount to enable the flow of the entirety. A crosslinking density parameter is incorporated into the equation, and hence the equation is similarly applicable to the polymer solution and the gel.

An increase in molecular weight or crosslinking density of a monomer solution acts in the direction of reducing the osmotic pressure thereof. Accordingly, the polymerization of a monomer in the monomer solution reduces the osmotic pressure. As described above, a reduction in osmotic pressure reduces a sucking force on the solvent or produces an expelling force thereon, and hence the swelling property of the polymerized product reduces as compared to that of the monomer. Also when the $\chi$ parameter is changed in the direction of being non-philic by the polymerization, the swelling property reduces. As described above, the polymer solution and the gel can be similarly handled in terms of osmotic pressure, though a cured product may be dissolved in the solvent when the crosslinking density of the cured product is low. Accordingly, herein, the dissolution of the cured product is also represented as "swelling".

When the swelling property of the cured product is reduced to a certain extent or more, the following phenomenon occurs: although the monomer is in the state of being dissolved in the solvent to form a single phase, the solution undergoes a phase separation into the cured product and the solvent along with the polymerization of the monomer. The phase separation is described as "polymerization solid-liquid separation" herein.

The inventors of the present invention have made an investigation, and as a result, have found that the occurrence of the polymerization solid-liquid separation requires a specific condition on a solvent concentration at the time of the polymerization. Even when the swelling property is reduced by the polymerization, in the case where the solvent is present only in an amount equal to or less than that at the time of equilibrium swelling around the polymerized product, the cured product completely sucks the solvent, and hence the cured product and the solvent form integrated gel. That is, as the solvent concentration at the time of the polymerization reduces, the polymerization solid-liquid separation does not occur. The term "equilibrium swelling" as used herein refers to a state in which the osmotic pressure of the cured product is zero. The consideration of, for example, a swollen state after the following facilitates the understanding of the equilibrium swelling: the cured product is brought into contact with the solvent through a semipermeable membrane, and is left to stand for a long time period. Further, the inventors of the present invention have found that the lower limit of the solvent concentration at which the polymerization solid-liquid separation occurs varies depending on the composition of the monomer that is a polymerizable component. This is because the amount of the solvent at the time of the equilibrium swelling described above varies depending on the properties of the cured product to be produced by the polymerization of the monomer. Many water-soluble monomers are free from causing the polymerization solid-liquid separation at any concentration, and hence it can be said that a monomer causing the polymerization solid-liquid separation is rather special.

The moisture concentration "x" (mass %) in the first image means a moisture concentration in the first image at the time of the initiation of its polymerization. The moisture concentration "x" (mass %) in the first image is preferably 50 mass % or more, more preferably 60 mass % or more, particularly preferably 65 mass % or more. In addition, the moisture concentration "y" (mass %) in the second image means a moisture concentration in the second image when the second image is brought into an equilibrium state under a high-humidity environment (at a humidity of 95%), and the concentration facilitates experimental measurement simulating a moisture amount at the time of the equilibrium swelling. According to the above-mentioned theoretical background, the achievement of a strict equilibrium swelling state requires direct immersion of the image in water or the placement thereof under an environment at a humidity of 100%. However, the inventors have found that such operations make it difficult to perform actual measurement because of, for example, the following reasons: the cured product is lost to sight in the water; and it becomes difficult to judge whether or not the image is in the equilibrium state owing to condensation. According to the above-mentioned theory, when the moisture concentration "x" is equal to or more than a moisture concentration at the time of the equilibrium swelling, that is, when "{(moisture concentration at time of equilibrium swelling)/x}≤1" is satisfied, the polymerization solid-liquid separation occurs. However, the moisture concentration "y" is lower than the moisture concentration at the time of the equilibrium swelling, and hence the inventors have revealed that the polymerization solid-liquid separation occurs when a relationship of (y/x)≤0.80 is satisfied, preferably when a relationship of (y/x)≤0.6 is satisfied.

The occurrence of the polymerization solid-liquid separation results in moisture separation from the cured product, and hence can increase the drying speed of the cured product as compared to that of gel holding moisture. The gel is in the state of containing an amount of the solvent smaller than that at the time of the equilibrium swelling, and has such an osmotic pressure as to be capable of further absorbing the solvent. It is because of the following reason that the drying speed of the cured product that has undergone the polymerization solid-liquid separation is faster than that of the gel: although the gel reduces the vapor pressure of the moisture through use of its osmotic pressure, the occurrence of the polymerization solid-liquid separation makes the reduction amount of the vapor pressure smaller.

At the time of the drying of gel, the removal of part of a liquid in the gel results in the occurrence of a strong contraction force based on a capillary pressure. Accordingly, when the cured product is gel, the curling of a printed product has been liable to occur along with its drying. However, when the polymerization solid-liquid separation occurs, the curling of the printed product occurring along with the drying is alleviated because the osmotic pressure of the cured product is lower than that of the gel and a water content in the cured product is lower than that of a monomer for forming the cured product. The occurrence of the polymerization solid-liquid separation facilitates the drying, and hence the polymerization solid-liquid separation is suitable for an ink jet printing method including a step of removing moisture after the curing of an image. In addition, the cured product and the moisture are separated from each other, and hence the moisture can be easily removed by bringing a liquid absorbing body such as a porous body into contact with the cured product. Accordingly, the polymerization solid-liquid separation is suitable for an ink jet printing method including a step of removing moisture from an image with the liquid absorbing body. To prevent the curling or cockling of a printed product caused by moisture permeation, there is a proposal of a so-called transfer type ink jet printing method including removing moisture from an intermediate image obtained by temporarily curing an ink on a transfer body and transferring the resultant onto a printing medium. The polymerization solid-liquid separation is suitable for such transfer type ink jet printing method because the separation facilitates the removal of moisture through drying or with the liquid absorbing body.

Conventional aqueous UV-curable inks have been cured after their drying in many cases. This is largely because of the following reason. The aqueous UV-curable inks are roughly classified into: an ink in which a polymerizable component is present in an undissolved and dispersed state such as an emulsion; and an ink in which such component is present in a dissolved state. When the polymerizable component is present in a dispersed state in the ink, to obtain a fast cured product, it has been required to perform a so-called film formation step of connecting the molecules of the dispersed polymerizable component to each other before the curing of the ink. In the film formation step, heat drying is typically performed. Meanwhile, in the case where the polymerizable component is dissolved in the ink, when the polymerizable component is cured before the drying of the ink, the component may be cured in a gel manner to cause such a problem as described below: it becomes difficult to remove moisture from the cured product; or the curling of the cured product is liable to occur owing to its drying contraction. That is, it has been difficult to cure the conventional aqueous UV-curable ink before its drying.

One large advantage of the aqueous UV-curable ink is so-called pinning in which an image can be immediately fixed by UV irradiation. The pinning is effective against a reduction in image quality caused by the repelling of the ink on a nonabsorbable printing medium, the occurrence of bleeding, or the entry of the ink applied later into an image formed with the ink that has been previously applied. Further, the pinning is effective against various problems caused by the permeation of a liquid component into an absorbable printing medium. When moisture is removed from an image with a liquid absorbing body, the image is preferably cured before the removal of the moisture. The ink jet printing method according to one aspect of the present invention has large significance in that an image can be cured before its drying.

Polymerization solid-liquid separation is a phenomenon in which the polymerization of a polymerizable component causes a phase separation between a cured product and a solvent such as water. In the phase separation, however, the mixture of the cured product and the solvent is not completely divided into two parts in a vertical manner, and a microscopic separated structure, typically, a porous body is often formed. The formation of the porous body may cause whitening or haze at the moment when the component is cured. In cases except a case in which the whitening or the haze is intentionally utilized at the time of image formation, it is preferred that the whitening and the haze be finally removed. The inventors of the present invention have made an investigation, and as a result, have found that when the complex modulus of elasticity of a solid content for forming the second image that is a cured product obtained by curing the first image, more specifically, the complex modulus of elasticity of a structural portion for forming the porous body is less than $10^{7.0}$ Pa, the whitening and the haze along with water removal are alleviated. When the complex modulus of elasticity of the solid content for forming the second image is less than $10^{7.0}$ Pa, preferably $10^{6.0}$ Pa or less, the porous structure of the porous body may be collapsed by the capillary force of the water at the time of the escape of the water from the pores of the porous body to alleviate the whitening and the haze. The solid content for forming the second image contains not only the cured product formed by the polymerization but also a water-insoluble component, such as pigment or resin particles. In addition, the lower limit value of the complex modulus of elasticity of the solid content for forming the second image is not particularly limited, but the complex modulus of elasticity of the solid content for forming the second image may be set to, for example, $10^{5.0}$ Pa or more.

The mechanism via which the polymerizable component A is polymerized is, for example, radical polymerization or ionic polymerization, and is not particularly limited. However, the radical polymerization is preferred because the polymerization is hardly inhibited by water. The polymerizable component A preferably includes an acrylamide structure that is highly resistant to hydrolysis. The acrylamide structure is an acryloylamino group that may have a substituent. One driving force for the polymerization solid-liquid separation is an increase in molecular weight by the polymerization. Accordingly, the molecular weight of the polymerizable component A is preferably as small as possible because a change in osmotic pressure by the polymerization is large. Specifically, the molecular weight of the polymerizable component A is preferably 800 or less.

It has been known that a phase separation comes in binodal decomposition that requires nucleation and nuclear growth, and spinodal decomposition that does not require any nucleation or nuclear growth and spontaneously advances. A theoretical equation for a spinodal curve serving as a boundary as to whether or not the spinodal decomposition occurs is described below.

$$\chi = \frac{1}{2}\left(\frac{1}{N\phi} + \frac{1}{1-\phi}\right)$$

In the theoretical equation, $\chi$ represents a parameter representing an interaction between two components, and a larger positive value thereof means that compatibility therebetween is lower. $\phi$ represents the volume fraction of a molecule of one of the components, and N represents the number of the segments of the molecule, and represents the number of lattices occupied by one molecule in lattice theory. The inside of the spinodal curve is a region in which the spinodal decomposition occurs, and a satisfactory phase separation occurs because a compatible state becomes an always unstable state free of any energetically metastable state.

A spinodal curve in a state in which the polymerizable component A is dissolved in a solvent is conceived. The concentration of the molecules of the component is represented by "$\phi$", and a phase diagram (spinodal curve) whose x-axis and y-axis indicate a solvent concentration "$1-\phi$" and the parameter "$\chi$", respectively is shown in FIG. 1. The spinodal curve draws a downwardly convex shape, and compatibilization between the component and the solvent occurs in a region below the curve, while a phase separation therebetween occurs in a region above the curve. As the N is increased, that is, the polymerizable component A is polymerized to have a larger molecular weight, the spinodal curve extends to higher solvent concentrations and lower positive values of the $\chi$ parameter. A solution having a solvent concentration and a $\chi$ parameter satisfying the following causes an extremely satisfactory polymerization solid-liquid separation: the solution in a state before the polymerization in which the molecular weight is small is present in the region in which the compatibilization occurs, and the solution in a state after the polymerization in which the molecular weight is large is present in the region in which the phase separation occurs.

Figure 2:
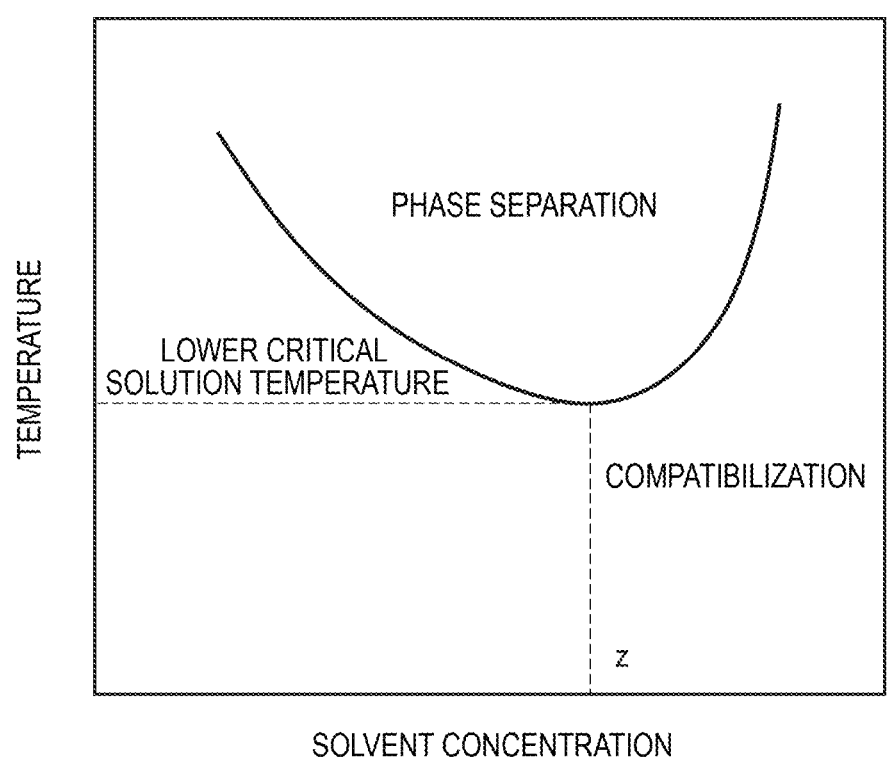
FIG. 2 is a schematic view (graph) of the phase separation curve of a solution having a lower critical solution temperature.

Some organic molecules have such properties as to be more hardly water-soluble at higher temperatures. This is probably because while such molecules hydrate to be dissolved in water at low temperatures, hydrated water is removed to reduce their solubility at high temperatures. A schematic view (graph) of the phase separation curve of a solution having a lower critical solution temperature is shown in FIG. 2. The x-axis and y-axis of the graph indicate a "solvent concentration" and a "temperature", respectively. As shown in FIG. 2, the phase separation curve draws a downwardly convex shape having a local minimum. The temperature at the local minimum is referred to as "lower critical solution temperature." Herein, when the polymerizable component A has a lower critical solution temperature in water, a moisture concentration at the lower critical solution temperature of the polymerizable component A is defined as a "moisture concentration "z" (mass %)."

An investigation on the $\chi$ parameter and a temperature in a solution having dissolved therein the polymerizable component A having a lower critical solution temperature (solution having lower criticality) shows that these values show the following positive correlation: when the values are large, the component and the solvent are non-philic; and when the values are small, the component and the solvent are compatible with each other. Accordingly, the polymerizable component A having a lower critical solution temperature is preferably used because polymerization solid-liquid separation satisfactorily occurs. The occurrence of the polymerization of the component shifts the moisture concentration (solvent concentration) to higher concentrations and shifts the temperature to lower temperatures, and hence the polymerization solid-liquid separation occurs. Accordingly, the moisture concentration "z" (mass %) at the lower critical solution temperature of the polymerizable component A and the moisture concentration "x" (mass %) in the first image preferably satisfy x≥z. When the value of the moisture concentration "z" is excessively large, room for the movement of the phase separation curve by the polymerization may become smaller to make it more difficult for the polymerization solid-liquid separation to occur. Accordingly, the moisture concentration "z" (mass %) preferably satisfies z≤0.95.

The polymerizable component A preferably has a plurality of polymerizable functional groups in a molecule thereof. That is, the polymerizable component A is preferably a polyfunctional monomer. The use of the polyfunctional monomer having a plurality of polymerizable functional groups in a molecule thereof as the polymerizable component A can improve the dynamic characteristics of the cured product (second image) to be formed. In addition, the polymerizable component A is preferably a polyfunctional monomer satisfying a relationship of "molecular weight/number of polymerizable functional groups≤150." The use of the polyfunctional monomer satisfying the above-mentioned relationship as the polymerizable component A enables the use of a crosslinking reaction as a driving force for the polymerization solid-liquid separation, and can increase the crosslinking density of the cured product. In addition, the lower limit value of the ratio "molecular weight/number of polymerizable functional groups" is not particularly limited, but the polymerizable component A is preferably, for example, a polyfunctional monomer satisfying a relationship of "50≤molecular weight/number of polymerizable functional groups≤150."

The moisture concentration "x" (mass %) in the first image and the moisture concentration "y" (mass %) in the second image brought into an equilibrium state under the environment at a humidity of 95% may each be calculated by measuring the mass of the corresponding image. Each of the moisture concentrations is defined by the expression "(mass of liquid component/mass of image)×100." However, a solid that has been present since before the application of the active energy ray is not included in the "mass of image." This is because the solid that has been originally present since before the application of the active energy ray does not contribute to the polymerization solid-liquid separation. For example, a pigment is not included in the "mass of image." Meanwhile, a component that has been present since before the application of the active energy ray and is dissolved in the water even after the application is included in the "mass of liquid component." For example, a water-soluble solvent or a surfactant is included in the "mass of liquid component." A water-soluble polymerization initiator or the like is also included in the "mass of liquid component" because only an extremely small amount thereof is typically incorporated into a polymerized molecular chain, and most thereof is water-soluble even after the application of the active energy ray. A component that is included in the "mass of image" but is not included in the "mass of liquid component" is, for example, the polymerizable component A.

With regard to the moisture concentration "y" (mass %) in the second image placed under the environment at a humidity of 95%, moisture concentrations when cured products obtained by curing inks having various moisture concentrations are placed under the environment at a humidity of 95% to reach equilibrium are desirably calculated. The temperature of the environment at a humidity of 95% only needs to be set to a temperature at the time of the formation of the image.

The complex modulus of elasticity of the solid content for forming the second image may be measured in accordance with the following procedure. A rheometer that can apply an active energy ray such as ultraviolet light (UV) may be used as a measuring apparatus. First, parallel plates are used as jigs, and an ink in a liquid state is interposed between the parallel plates. Next, the active energy ray is applied to cure the ink, and then a gap between the plates is reduced to compress the ink (cured product). When polymerization solid-liquid separation occurs, the water of the ink is discharged to the outside, and hence the solid content is concentrated in the gap. When the cured product is compressed to a gap corresponding to a solid content amount in the ink, the compression is stopped, and its complex modulus of elasticity is measured in a vibration mode. Conditions for the vibration mode are as follows: a strain amount of 1% and a frequency of 30 Hz. The complex modulus of elasticity is defined by the following equation. An ink simulating composition immediately before the application of the active energy ray is used as the ink. Of course, when the actually formed cured product (second image) can be prepared, the complex modulus of elasticity may be measured by using the cured product.

$$\text{Complex modulus of elasticity} = \{(\text{storage modulus of elasticity})^2 + (\text{loss modulus of elasticity})^2\}^{1/2}$$

The lower critical solution temperature of the polymerizable component A and the moisture concentration "z" at the lower critical solution temperature of the polymerizable component A may be measured in accordance with the following procedure. First, aqueous solutions of the polymerizable component A having various concentrations are prepared. Next, the dissolved states of the polymerizable component A in the aqueous solutions are observed while the temperatures of the solutions are changed with, for example, a bath capable of heating and cooling. An aqueous solution of the polymerizable component A having a lower critical solution temperature undergoes clouding when its temperature becomes a predetermined value or more. The temperature at which such clouding occurs is a "clouding point." Then, a clouding point that becomes a local minimum out of the clouding points measured for the aqueous solutions having various concentrations is adopted as the "lower critical solution temperature (° C.)." Further, the moisture concentration of the aqueous solution having the "lower critical solution temperature" is adopted as the "moisture concentration "z" (mass %)."

A temperature at the time of the measurement of the lower critical solution temperature only needs to be set to from 5° C. to 80° C. Even if the lower critical solution temperature is less than 5° C., and hence the moisture concentration "z" cannot be determined, a magnitude relationship between the moisture concentration "x" and the moisture concentration "z" can be judged. The moisture concentration "x" is a value defined under a state in which the polymerizable component A is dissolved in the first image. Accordingly, even when the lower critical solution temperature is less than 5° C., as long as the moisture concentration point which is smaller than the moisture concentration "x" and at which the component is insolubilized is present, the moisture concentration "z" that is even smaller than the insolubilizing point is present, and hence a relationship of $x \geq z$ is satisfied. Similarly, when the moisture concentration "x" is less than 0.95, $z \leq 0.95$ is satisfied. When the ink contains the plurality of kinds of polymerizable components A each having a lower critical solution temperature, the moisture concentration "z" is measured for each of the polymerizable components A, and the arithmetic average of values obtained by weighting the measured values by the contents of the respective components is redefined as the "moisture concentration "z"." In the case of, for example, an ink containing a polymerizable component A1, which provides a moisture concentration "z" of 50 mass %, at a content of 20 mass % and a polymerizable component A2, which provides a moisture concentration "z" of 80 mass %, at a content of 10 mass %, the moisture concentration "z" (mass %) of the polymerizable components A in the ink is calculated from the following equation.

$$\{(0.5 \times 0.2 + 0.8 \times 0.1)/0.3\} \times 100 = 60 \text{mass \%}$$

(Active Energy Ray-Curable Aqueous Ink for Ink Jet)

An ink containing the water-soluble polymerizable component A and water is used as the ink. That is, the ink to be used in the ink jet printing method according to one aspect of the present invention is an active energy ray-curable aqueous ink for inkjet. Description is given below by taking an ink containing the polymerizable component A, which is polymerized by being irradiated with ultraviolet light (UV) serving as a typical example of an active energy ray, as an example.

[Polymerizable Component A]

The polymerizable component A is a water-soluble component that is polymerized by the application of an active energy ray such as ultraviolet light (UV) to produce a polymerized product (cured product). The term "water-soluble" as used herein refers to the property by which 1 mass % or more of the component is dissolved in water at 25° C. The polymerizable component A preferably has, in a molecular structure thereof, an ethylenically unsaturated bond that can be cured by ultraviolet light and a hydrophilic moiety. Examples of the hydrophilic moiety may include: a hydroxy group, a carboxy group, a phosphoric acid group, a sulfo group, and salts of these groups; an ether bond; and an amide bond. The polymerizable component A may be incorporated into a reaction liquid to be described later. Specific examples of the polymerizable component A may include polymerizable components A-1 to A-16 represented by the following structural formulae (A-1) to (A-16). Of those, the polymerizable components A-3 and A-14 are preferred because the components each easily cause polymerization solid-liquid separation.

(A-1)

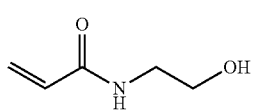

(A-2)

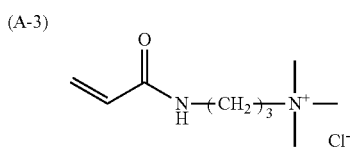

(A-3)

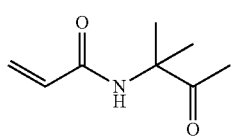

(A-4)

(A-5)

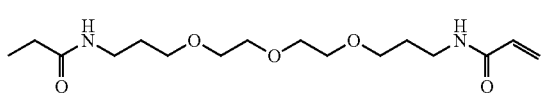

(A-6)

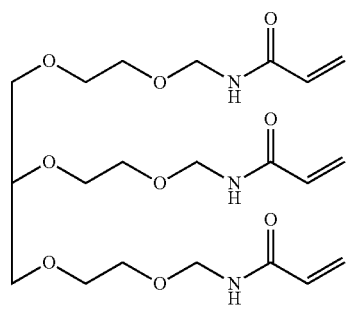

-continued
(A-7)
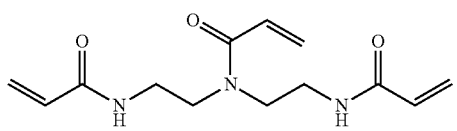
(A-8)
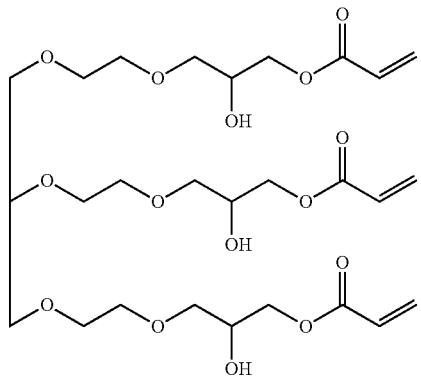
(A-9)
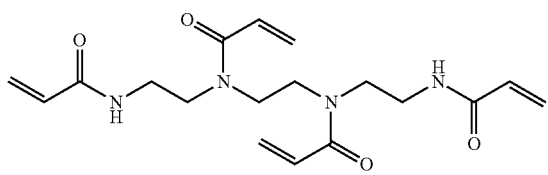
(A-10)
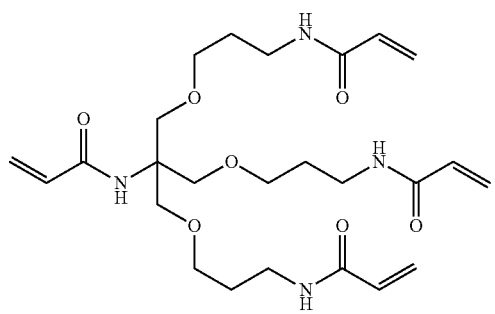
(A-11)
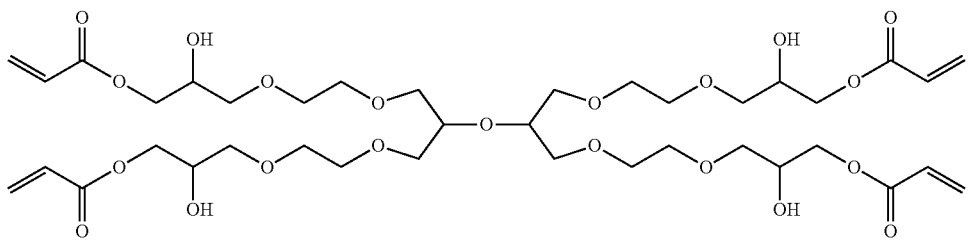
(A-12)
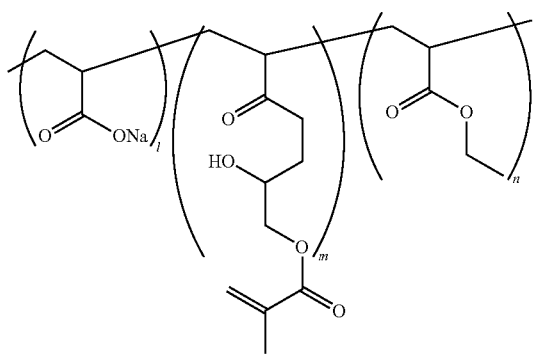
$m/(l + m + n) = 40\%$
$l/(l + m + n) = 40\%$
Average molecular weight: about 35,000
(A-13)
Average molecular weight: 400
(A-14)
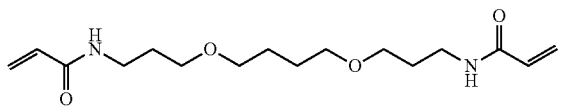
(A-15)
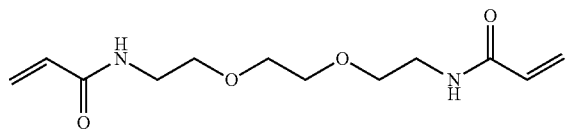

(A-16)

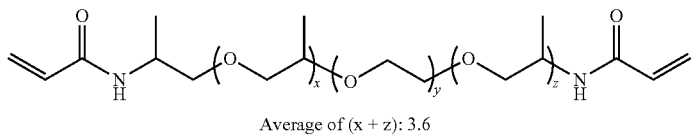

Average of (x + z): 3.6

The two or more kinds of polymerizable components A may be incorporated into the ink. The content of the polymerizable component A in the ink is preferably from 1 mass % to 50 mass %, more preferably from 5 mass % to 40 mass %, particularly preferably from 10 mass % to 35 mass % with respect to the total mass of the ink.

[Polymerization Initiator]

A water-soluble polymerization initiator is preferably incorporated into the ink. When the polymerizable component A is a radically polymerizable substance, a compound that generates a radical is typically used as the polymerization initiator. Compounds represented by the following general formulae (1) to (5) are each preferably used as the polymerization initiator:

(1)

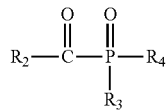

in the general formula (1), $R_2$ represents an alkyl group or a phenyl group, $R_3$ represents an alkoxy group or a phenyl group, and $R_4$ represents a group represented by the following general formula (1-1);

(1-1)

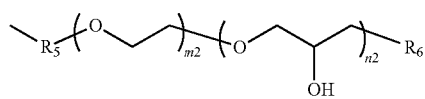

in the general formula (1-1), $R_5$ represents —$[CH_2]_{x2}$— (x2=0 or 1) or a phenylene group, m2 represents an integer of from 0 to 10, n2 represents 0 or 1, and $R_6$ represents a hydrogen atom, a sulfo group, a carboxy group, a hydroxy group, or a salt thereof;

(2)

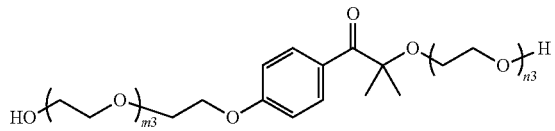

in the general formula (2), m3 represents an integer of 1 or more, n3 represents an integer of 0 or more, and m3+n3 represents an integer of from 1 to 8;

(3)

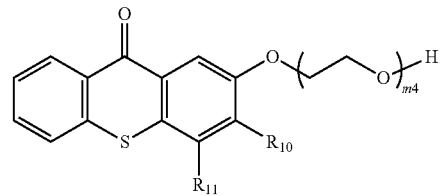

in the general formula (3), $R_{10}$ and $R_{11}$ each independently represent a hydrogen atom or an alkyl group, and m4 represents an integer of from 5 to 10;

(4)

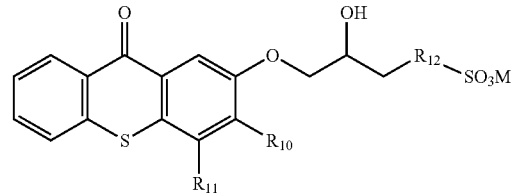

in the general formula (4), $R_{10}$ and $R_{11}$ each independently represent a hydrogen atom or an alkyl group, $R_{12}$ represents —$(CH_2)_x$— (x=0 or 1), —O—$(CH_2)_y$— (y=1 or 2), or a phenylene group, and M represents a hydrogen atom or an alkali metal; and (5)

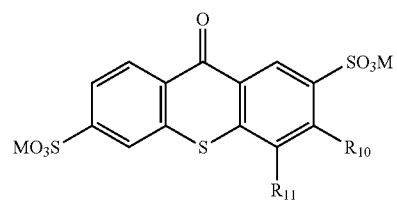

in the general formula (5), $R_{10}$ and $R_{11}$ each independently represent a hydrogen atom or an alkyl group, and M represents a hydrogen atom or an alkali metal.

Of the compounds represented by the above-mentioned general formulae, the compounds represented by the general formulae (1) to (3) are preferred, and the compounds represented by the general formulae (1) and (2) are more preferred.

In the general formula (1), the alkyl group and the phenyl group each represented by $R_2$ may each have a substituent. Examples of the substituent may include a halogen atom, a lower alkyl group having 1 to 5 carbon atoms, a lower alkoxy group having 1 to 5 carbon atoms, the group represented by the general formula (1-1), a sulfo group, a carboxy group, a hydroxy group, a salt of a sulfo group (—$SO_3M$), a salt of a carboxy group (—COOM), and a salt of a hydroxy group (—OM). M represents a hydrogen atom, an alkali metal, an alkaline earth metal, or an ammonium represented by HNR$_7$R$_8$R$_9$ (R$_7$, R$_8$, and R$_9$ each independently represent a hydrogen atom, a lower alkyl group having 1 to 5 carbon atoms, a monohydroxy-substituted lower alkyl group having 1 to 5 carbon atoms, or a phenyl group). In the general formula (1), R$_2$ preferably represents a phenyl group having a lower alkyl group having 1 to 5 carbon atoms as a substituent.

In the general formula (1-1), the phenylene group represented by R$_5$ may have a substituent. Examples of the substituent may include a halogen atom, a lower alkyl group having 1 to 5 carbon atoms, a lower alkoxy group having 1 to 5 carbon atoms, the group represented by the general formula (1-1), a sulfo group, a carboxy group, a hydroxy group, a salt of a sulfo group (—SO$_3$M), a salt of a carboxy group (—COOM), and a salt of a hydroxy group (—OM). M represents a hydrogen atom, an alkali metal, an alkaline earth metal, or an ammonium represented by HNR$_7$R$_8$R$_9$ (R$_7$, R$_8$, and R$_9$ each independently represents a hydrogen atom, a lower alkyl group having 1 to 5 carbon atoms, a monohydroxy-substituted lower alkyl group having 1 to 5 carbon atoms, or a phenyl group).

In the general formula (1-1), examples of the salt represented by R$_6$ may include a salt of a sulfo group (—SO$_3$M), a salt of a carboxy group (—COOM), and a salt of a hydroxy group (—OM). M represents a hydrogen atom, an alkali metal, an alkaline earth metal, or an ammonium represented by HNR$_7$R$_8$R$_9$ (R$_7$, R$_8$, and R$_9$ each independently represent a hydrogen atom, a lower alkyl group having 1 to 5 carbon atoms, a monohydroxy-substituted lower alkyl group having 1 to 5 carbon atoms, or a phenyl group).

In the general formula (1), the alkoxy group and the phenyl group each represented by R$_3$ may each have a substituent. Examples of the substituent may include a halogen atom, a lower alkyl group having 1 to 5 carbon atoms, and a lower alkoxy group having 1 to 5 carbon atoms. In the general formula (1), R$_3$ preferably represents an alkoxy group, and more preferably represents —OC$_2$H$_5$ or —OC(CH$_3$)$_3$.

In the general formulae (3) to (5), the alkyl group represented by each of R$_{10}$ and R$_{11}$ may have a substituent. Examples of the substituent may include a halogen atom, a sulfo group, a carboxy group, a hydroxy group, a salt of a sulfo group (—SO$_3$M), a salt of a carboxy group (—COOM), and a salt of a hydroxy group (—OM). M represents a hydrogen atom, an alkali metal, an alkaline earth metal, or an ammonium represented by HNR$_7$R$_8$R$_9$ (R$_7$, R$_8$, and R$_9$ each independently represent a hydrogen atom, a lower alkyl group having 1 to 5 carbon atoms, a monohydroxy-substituted lower alkyl group having 1 to 5 carbon atoms, or a phenyl group).

Suitable specific examples of the polymerization initiator may include compounds represented by the following structural formulae (A) to (E) (polymerization initiators A to E).

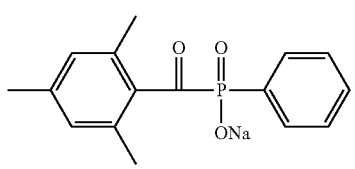

(A)

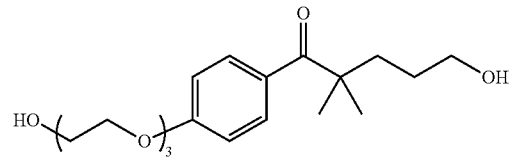

(B)

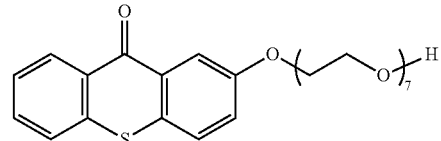

(C)

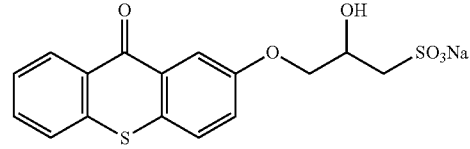

(D)

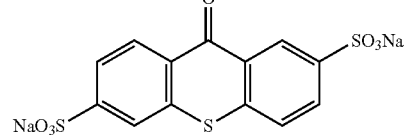

(E)

The content of the polymerization initiator in the ink is preferably 0.1 mass % or more and 20 mass % or less, more preferably 1 mass % or more and 10 mass % or less with respect to the total mass of the polymerizable component A. When the amount of the polymerization initiator is excessively large, an unreacted polymerization initiator is liable to remain in the image, and hence the strength of the image reduces to some extent in some cases.

Two or more kinds of polymerization initiators may be used in combination. When the two or more kinds of polymerization initiators are used in combination, the utilization of light having a wavelength that cannot be effectively utilized with only one kind of polymerization initiator is expected to generate a larger amount of a radical. When an electron beam curing method including using an electron beam as an active energy ray is adopted, the polymerization initiator may not be incorporated.

When a thioxanthone-based polymerization initiator or the like is used, a hydrogen-donating agent is preferably added to the ink. Examples of the hydrogen-donating agent may include triethanolamine and monoethanolamine.

An active energy ray curing catalyst may be incorporated into the ink. Catalysts having skeletons, such as an α-hydroxy ketone, benzyl ketal, an acylphosphine, and thioxanthone, are each preferred as the active energy ray curing catalyst. Further, the active energy ray curing catalyst is preferably hydrophilic so as to fully exhibit its reactivity. Accordingly, the active energy ray curing catalyst is preferably a compound having, for example, any one of the following in a molecule thereof: a hydroxy group, a carboxy group, a phosphoric acid group, a sulfo group, and salts thereof; an ether bond; and an amide bond. In addition, a sensitizer that serves to expand light absorption wavelengths is preferably added to the ink for increasing a reaction rate.

[Coloring Material]

A coloring material may be incorporated into the ink. A pigment and a dye may each be used as the coloring material. A general pigment may be used as the pigment. Specific examples of the pigment include: C.I. Pigment Blue 1, 2, 3, 15:3, 16, and 22; C.I. Pigment Red 5, 7, 12, 48(Ca), 48(Mn), 57(Ca), 112, and 122; C.I. Pigment Yellow 1, 2, 3, 13, 16, and 83; Carbon Black No. 2300, 900, 33, 40, 52, MA7, MA8, and MCF88 (all of which are manufactured by Mitsubishi Chemical Corporation); RAVEN 1255 (manufactured by Columbia); REGAL 330R, 660R, and MOGUL (all of which are manufactured by Cabot Corporation); and Color Black FW1, FW18, S170, S150, and Printex 35 (all of which are manufactured by Degussa AG).

When the pigment is used, a dispersant may be used in combination. A water-soluble resin having a weight-average molecular weight of 1,000 or more and 15,000 or less is preferably used as the dispersant. Examples of the dispersant include block copolymers or random copolymers formed of styrene and derivatives thereof, vinylnaphthalene and derivatives thereof, an aliphatic alcohol ester of an $\alpha,\beta$-ethylenically unsaturated carboxylic acid, acrylic acid and derivatives thereof, maleic acid and derivatives thereof, itaconic acid and derivatives thereof, and fumaric acid and derivatives thereof, and salts thereof. In addition, the following so-called self-dispersing pigment may be used as the pigment: an ionic group is bonded to each of the surfaces of the particles of the pigment, and hence the pigment can be dispersed in a medium without use of any dispersant.

A general dye may be used as the dye. Specific examples of the dye may include: C.I. Direct Blue 6, 8, 22, 34, 70, 71, 76, 78, 86, 142, and 199; C.I. Acid Blue 9, 22, 40, 59, 93, 102, 104, 117, 120, 167, and 229; C.I. Direct Red 1, 4, 17, 28, 83, and 227; C.I. Acid Red 1, 4, 8, 13, 14, 15, 18, 21, 26, 35, 37, 249, 257, and 289; C.I. Direct Yellow 12, 24, 26, 86, 98, 132, and 142; C.I. Acid Yellow 1, 3, 4, 7, 11, 12, 13, 14, 19, 23, 25, 34, 44, and 71; C.I. Food Black 1 and 2; and C.I. Acid Black 2, 7, 24, 26, 31, 52, 112, and 118.

The ink may be used as a so-called transparent ink that is substantially free of any coloring material. The use of the transparent ink can form a cured film that is substantially colorless and transparent.

[Solvent]

The ink is an aqueous ink containing water as a main solvent. The content of the water in the ink is preferably 30 mass % or more, more preferably 50 mass % or more with respect to the total mass of the ink.

In addition, various organic solvents may be further incorporated into the ink for the purpose of improving various kinds of performance of the ink and to the extent that the original characteristics thereof are not impaired. For example, a certain kind of organic solvent can impart nonvolatility to the ink. In addition, various organic solvents may be incorporated into the ink for the purposes of, for example, adjusting its viscosity, adjusting its surface tension, and imparting wettability to a printing medium.

A water-soluble organic solvent having a high boiling point and a low vapor pressure is preferably used as such organic solvent. Specific examples of the organic solvent may include polyethylene glycol, polypropylene glycol, ethylene glycol, propylene glycol, butylene glycol, triethylene glycol, thiodiglycol, hexylene glycol, diethylene glycol, ethylene glycol monomethyl ether, diethylene glycol monomethyl ether, and glycerin. In addition, alcohols, such as ethyl alcohol and isopropyl alcohol, and various surfactants may each be added to the ink as a component for adjusting its viscosity, surface tension, or the like.

(Reaction Liquid)

In the ink jet printing method according to one aspect of the present invention, a reaction liquid containing a component that is brought into contact with the ink to increase the viscosity of the ink may be used. The increase in viscosity of the ink includes: a case in which the components in the ink chemically react with, or physically adsorb to, each other to increase the viscosity of the ink; and a case in which the components in the ink aggregate to locally increase the viscosity. The component for increasing the viscosity of the ink has the following effect: the component reduces the fluidity of the ink on a printing medium to suppress bleeding and beading. A polyvalent metal ion, an organic acid, a cationic polymer, porous fine particles, and the like may each be used as the component for increasing the viscosity of the ink. Of those, the polyvalent metal ion and the organic acid are preferred. The content of the component for increasing the viscosity of the ink in the reaction liquid is preferably 5 mass % or more with respect to the total mass of the reaction liquid.

Examples of the polyvalent metal ion may include: divalent metal ions, such as $Ca^{2+}$, $Cu^{2+}$, $Ni^{2+}$, $Mg^{2+}$, $Sr^{2+}$, $Ba^{2+}$, and $Zn^{2+}$; and trivalent metal ions, such as $Fe^{3+}$, $Cr^{3+}$, $Y^{3+}$, and $Al^{3+}$.

Examples of the organic acid may include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxysuccinic acid, and dioxysuccinic acid.

Water or a low-volatile organic solvent may be incorporated into the reaction liquid. Deionized water is preferably used as the water. A known organic solvent may be used as the organic solvent. A surfactant or a viscosity modifier may be added to the reaction liquid for appropriately adjusting its surface tension or viscosity. Examples of the surfactant may include an acetylene glycol ethylene oxide adduct and a perfluoroalkyl ethylene oxide adduct. A commercially available product of the acetylene glycol ethylene oxide adduct may be, for example, a product available under the product name "ACETYLENOL E100" (manufactured by Kawaken Fine Chemicals Co., Ltd.). In addition, a commercially available product of the perfluoroalkyl ethylene oxide adduct may be, for example, a product available under the product name "MEGAFACE F444" (manufactured by DIC Corporation). A component, such as a curing component that is cured by an active energy ray or a polymerization initiator, may be further incorporated into the reaction liquid.

<Ink Jet Printing Apparatus and Ink Jet Printing Method>

An ink jet printing apparatus according to one aspect of the present invention includes: a unit configured to perform a first step of forming a first image; and a unit configured to perform a second step of forming a second image. The unit configured to perform the first step is a unit for performing the first step of ejecting an ink containing a water-soluble polymerizable component A and water from a printing head of an ink jet system to apply the ink to a medium M, to thereby form the first film. At this time, the polymerizable component A is dissolved in the first image. The unit configured to perform the second step is a unit for performing the second step of applying an active energy ray to the first image to form the second image. In addition, as described above, a moisture concentration "x" (mass %) in the first image and a moisture concentration "y" (mass %) in the second image placed under an environment at a humidity of 95% satisfy a relationship of $0<(y/x)\leq 0.80$.

The ink jet printing method according to one aspect of the present invention preferably further includes a third step of removing at least part of moisture (hereinafter also described as "liquid component") from the second image to form a third image. In addition, the method preferably further includes a fourth step of transferring the third image, which has been formed by removing the liquid component from the second image, from the medium M onto a medium N to form a fourth image on the medium N.

Examples of the ink jet printing apparatus according to one aspect of the present invention may include: (i) a transfer type ink jet printing apparatus that transfers an image formed on a transfer body onto a printing medium; and (ii) a direct drawing type ink jet printing apparatus that directly forms an image on the printing medium. The use of the transfer type ink jet printing apparatus can perform an ink jet printing method including the above-mentioned fourth step.

(Transfer Type Ink Jet Printing Apparatus)

Figure 3:
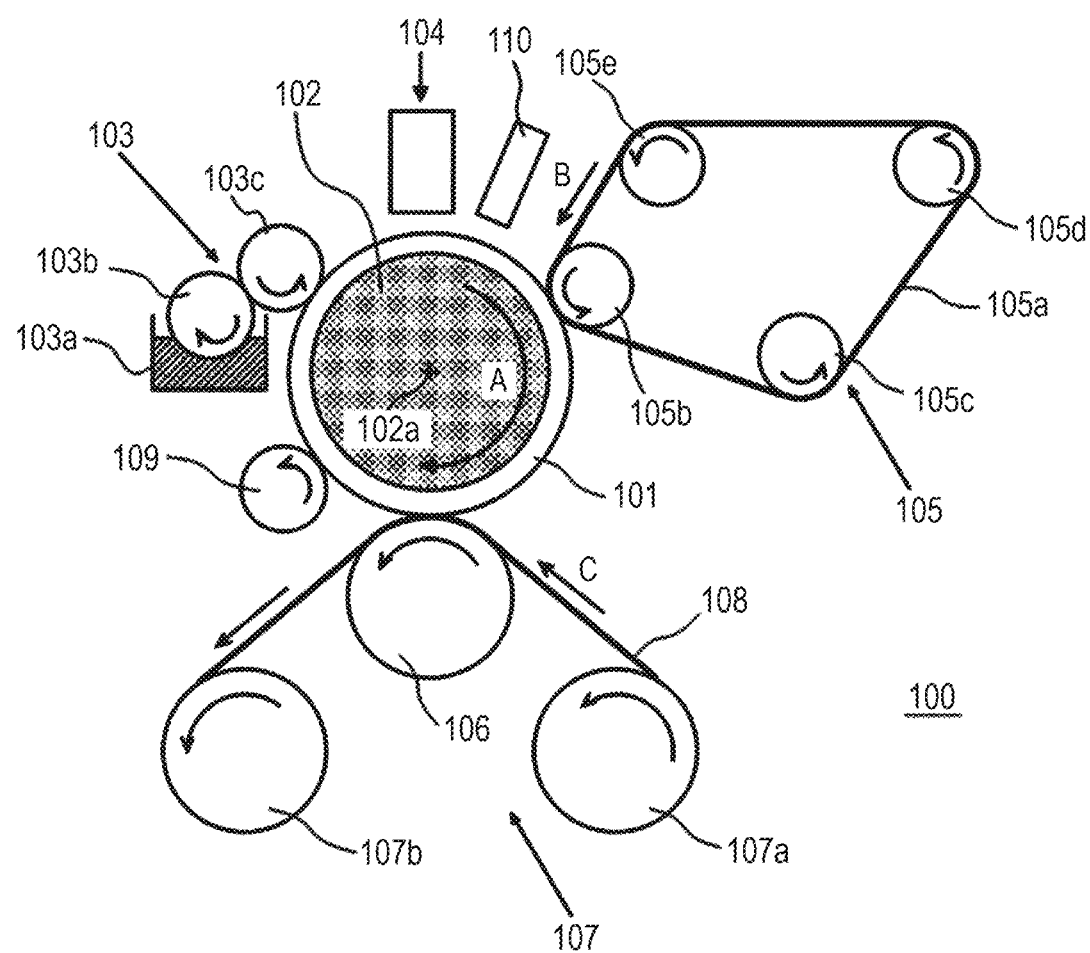
FIG. 3 is a schematic view for illustrating one embodiment of an ink jet printing apparatus of the present invention.

FIG. 3 is a schematic view for illustrating one embodiment of the ink jet printing apparatus according to one aspect of the present invention. The ink jet printing apparatus of the embodiment illustrated in FIG. 3 is a transfer type ink jet printing apparatus 100 that transfers an image formed on a transfer body onto a printing medium. The transfer type ink jet printing apparatus 100 includes a transfer body 101 (medium M), a reaction liquid applying device 103, an ink applying device 104, a liquid absorbing device 105, and a pressing member 106. The transfer body 101 is supported by a support member 102. The reaction liquid applying device 103 is a device that applies a reaction liquid containing a reagent that reacts with an ink to the transfer body 101. The ink applying device 104 includes a printing head that applies the ink to the transfer body 101 having applied thereto the reaction liquid to form a first image. The transfer type ink jet printing apparatus 100 further includes an active energy ray application device 110 that applies ultraviolet light to the first image on the transfer body 101 to form a second image. The liquid absorbing device 105 is a device that brings a liquid absorbing body into contact with the second image to absorb and remove at least part of moisture (liquid component) from the second image, to thereby form a third image. The pressing member 106 is a member for transferring the third image onto a sheet-shaped printing medium 108 (medium N) such as paper to form a fourth image on the printing medium 108 (medium N). Further, the transfer type ink jet printing apparatus 100 may include a transfer body-cleaning member 109 that cleans the surface of the transfer body 101 after the transfer as required.

The transfer body 101 rotates in the direction of the arrow A about the rotation axis 102a of the support member 102. After the reaction liquid has been applied from the reaction liquid applying device 103 to the transfer body 101 that is rotating, the ink is applied from the ink applying device 104 to form the first image on the transfer body 101. Next, the ultraviolet light is applied from the active energy ray application device 110 to the first image on the transfer body 101 to form the second image. After that, the second image thus formed is moved by the rotation of the transfer body 101 to the position at which the image is brought into contact with the liquid absorbing member 105a of the liquid absorbing device 105.

The liquid absorbing member 105a for forming the liquid absorbing device 105 moves (rotates) in the direction of the arrow B in synchronization with the rotation of the transfer body 101. The second image formed on the transfer body 101 is brought into contact with the liquid absorbing member 105a that is moving. During the contact, the liquid absorbing member 105a absorbs and removes the liquid component from the second image to form the third image. The third image brought into a state in which the ink is concentrated by the removal of the liquid component is moved by the rotation of the transfer body 101 to a transfer section where the image is brought into contact with the printing medium 108 conveyed by a printing medium conveying device 107. The third image and the printing medium 108 are brought into contact with each other by being pressed from the pressing member 106 side under the state of being interposed between the transfer body 101 and the pressing member 106. During the contact of the third image with the printing medium 108, the pressing member 106 presses the transfer body 101 to transfer the third image onto the printing medium 108. Thus, the desired fourth image is formed on the printing medium 108. The fourth image is a reverse image of the image before the transfer (third image). As described above, at least part of the moisture (liquid component) is removed on the transfer body 101, and then the third image is transferred onto the printing medium 108, and hence the occurrence of, for example, curling and cockling resulting from the permeation of the liquid component into the printing medium 108 can be suppressed.

[1] Transfer Body

The transfer body 101 includes a surface layer including a surface on which an image is formed. A material for forming the surface layer may be, for example, a resin or ceramic. A resin having a siloxane structure is preferred, and a material having a high compressive modulus of elasticity is preferred from the viewpoints of durability and the like. The transfer body may be used after having been subjected to surface treatment for improving, for example, its wettability with the reaction liquid and its transferability.

The transfer body preferably includes, between the surface layer and the support member, a compressive layer having a function of absorbing a pressure fluctuation. The compressive layer disperses a local pressure fluctuation to absorb the deformation of the surface layer. Thus, the arrangement of the compressive layer can maintain satisfactory transferability even when high-speed printing is performed. A material for forming the compressive layer may be, for example, an elastic material such as a rubber material. Of such materials, a rubber material having a porous structure, which is obtained as follows, is preferred: fillers, such as a foaming agent, hollow fine particles, and a salt, are blended into a raw material rubber together with a vulcanizing agent and a vulcanization accelerator, and the blend is molded into the material. When a pressure around such elastic material fluctuates, its void portions are compressed while being changed in volume, and hence the deformation of the material in a direction except its compression direction is small. Accordingly, the transferability and durability of the transfer body can be improved. Examples of the porous structure may include an open void structure in which voids are linked to each other and a closed void structure in which voids are independent of each other.

The transfer body preferably further includes an elastic layer between the surface layer and the compressive layer. A material for forming the elastic layer may be, for example, a resin material or a ceramic material. Of those, an elastic material such as a rubber material is preferred because the material is easy to process, shows a small change in modulus of elasticity with temperature, and is excellent in transferability.

The respective layers (the surface layer, the elastic layer, and the compressive layer) for forming the transfer body may be bonded to each other with an adhesive or a double-sided tape. A reinforcing layer having a high compressive modulus of elasticity may be arranged for suppressing the lateral elongation of the transfer body at the time of its mounting on an apparatus to keep its resilience. A woven fabric or the like may be used as the reinforcing layer. With regard to the layers except the surface layer out of the layers for forming the transfer body, the elastic layer and the compressive layer may be arbitrarily combined with each other. The size of the transfer body may be freely selected in accordance with a printing speed and the size of an image. Examples of the shape of the transfer body may include a sheet shape, a roller shape, a belt shape, and an endless web shape.

[2] Support Member

The transfer body 101 is supported on the support member 102. The transfer body may be arranged on the support with, for example, an adhesive or a double-sided tape. The transfer body 101 may be arranged on the support member 102 with a member for arrangement including a material, such as a metal, ceramic, or a resin. The support member 102 is required to have a certain degree of structural strength from the viewpoints of its conveyance accuracy and durability. A material for the support member may be, for example, a metal, ceramic, or a resin. Of those, a metal material such as aluminum is preferably used. The use of the metal material can impart, to the transfer body, rigidity enabling the transfer body to withstand a stress at the time of transfer and dimensional accuracy, and can alleviate inertia at the time of the operation of the transfer body to improve the control responsiveness thereof

[3] Reaction Liquid Applying Device

The transfer type ink jet printing apparatus 100 illustrated in FIG. 3 includes the reaction liquid applying device 103 that applies the reaction liquid to the transfer body 101. The reaction liquid applying device 103 is a gravure offset roller including: a reaction liquid accommodating portion 103a that accommodates the reaction liquid; and reaction liquid applying members 103b and 103c that apply the reaction liquid accommodating portion 103a to the transfer body 101. Examples of the reaction liquid applying device may include a gravure offset roller and a printing head of an ink jet system. Of those, the roller is preferably used to apply the reaction liquid to the transfer body.

[4] Ink Applying Device

The transfer type ink jet printing apparatus 100 illustrated in FIG. 3 includes the ink applying device 104 that is an ink applying unit for applying the ink to the transfer body 101. It is preferred that a printing head of an ink jet system be used as the ink applying device to eject and apply the ink. Examples of the printing head may include: a printing head of such a form as to eject the ink through the formation of air bubbles by film boiling caused in the ink with an electrothermal converter; a printing head of such a form as to eject the ink with an electromechanical converter; and a printing head of such a form as to eject the ink through utilization of static electricity. Of those, the printing head of such a form as to utilize the electrothermal converter is preferred because the head can print a high-density image at a higher speed.

The printing head is a full-line head extended in a Y-direction, and has ejection ports arranged in a range covering the width of the image printing region of a printing medium having the maximum usable size. The lower surface (transfer body 101 side) of the printing head has an ejection port surface having opened therein the ejection ports. The ejection port surface faces the surface of the transfer body 101 with a minute gap (about several millimeters) therebetween. The printing head may be a serial head that can move in the Y-direction in addition to the full-line head.

The ink applying device 104 may include a plurality of printing heads for applying inks of respective colors, such as cyan, magenta, yellow, and black (CMYK) colors, to the transfer body 101. For example, when an ink image is formed with four kinds of inks of CMYK colors, the ink applying device includes four printing heads that eject the respective four kinds of inks of CMYK colors. In addition, the device may include a printing head that ejects an ink free of any coloring material (clear ink).

[5] Active Energy Ray Application Device

The transfer type ink jet printing apparatus 100 illustrated in FIG. 3 includes the active energy ray application device 110 that applies an active energy ray to the first image formed on the transfer body 101. The application of the active energy ray to the first image can form the second image on the transfer body 101 (medium M). The active energy ray is preferably applied to the first image formed on the transfer body 101 without through a step of drying the first image by at least one of heating or air blowing.

Examples of the active energy ray application device may include an ultraviolet light application device and an electron beam application device. A known application device may be used as the ultraviolet light application device as long as the device can apply light having the wavelength at which the polymerization of a polymerizable component advances such as the absorption wavelength of a polymerization initiator. Examples of the ultraviolet light application device may include a mercury lamp, a metal halide lamp, an excimer lamp, and an LED. In addition, the wavelength of ultraviolet light is not limited to a wavelength of 400 nm or less, and the light only needs to have a peak wavelength at at least 400 nm or less, and may include light having a wavelength in a visible light region of more than 400 nm. In addition, a known application device may be used as the electron beam application device as long as the device can apply an electron beam that advances the polymerization of the polymerizable component.

Conditions for the application of the ultraviolet light include an irradiance and a cumulative light quantity in addition to the wavelength. The irradiance represents a radiant flux per unit area, and is often represented in the unit of $mW/cm^2$. The cumulative light quantity represents energy per unit area obtained by integrating the irradiance over time, and is often represented in the unit of $mJ/cm^2$. The irradiance and the cumulative light quantity may each be measured with a general irradiance meter corresponding to the ultraviolet light.

[6] Liquid Absorbing Device (Liquid Removing Device)

The liquid absorbing device 105 includes: the liquid absorbing member 105a; and a pressing member 105b for liquid absorption that presses the liquid absorbing member 105a against the second image on the transfer body 101. When the device includes the pressing member 105b having a columnar shape and the liquid absorbing member 105a having a belt shape, the liquid absorbing member 105a is pressed against the transfer body 101 by the pressing member 105b to absorb and remove the liquid component from the second image. Thus, the third image can be formed. In addition, the liquid component can be absorbed from the second image by pressing the pressing member having a columnar shape, the member having the liquid absorbing member bonded to its outer peripheral surface, against the transfer body. In consideration of, for example, space in the printing device, the shape of the liquid absorbing member 105a is preferably a belt shape. The liquid absorbing device 105 including the liquid absorbing member 105a having a belt shape may include tensioning members, such as tensioning rollers 105c, 105d, and 105e, which tension the liquid absorbing member 105a.

When the liquid absorbing member 105a including a porous layer is brought into contact with the second image by using the pressing member 105b, the liquid component in the second image can be absorbed by the liquid absorbing member 105a. For example, a method including heating the second image, a method including blowing low-humidity air to the image, or a method including reducing a pressure around the image may be used as a method of absorbing (or removing) the liquid component in the second image instead of the method including bringing the liquid absorbing member into contact with the image. Further, those methods of absorbing (or removing) the liquid component may be used in combination. In addition, those methods may be applied to the second image before and after the absorption of the liquid component.

The liquid absorbing member 105a rotates in conjunction with the rotation of the transfer body 101. Accordingly, the shape of the liquid absorbing member 105a is preferably a shape that can repeatedly absorb the liquid, and specific examples thereof may include shapes, such as an endless belt shape and a drum shape. The liquid component absorbed by the liquid absorbing member 105a including the porous layer may be removed from the liquid absorbing member 105a by, for example, a method including absorbing the component from the rear surface of the porous layer. After the removal of the liquid component, the liquid absorbing member 105a is rotated to be brought into contact with a new second image. Thus, the liquid component in the second image can be efficiently absorbed.

[7] Pressing Member

The transfer type ink jet printing apparatus 100 illustrated in FIG. 3 includes a transfer unit that bringing the third image into contact with the printing medium to transfer the image. Specifically, as illustrated in FIG. 3, the image after the removal of the liquid (third image) on the transfer body 101 is brought into contact with the printing medium 108 conveyed by the printing medium conveying device 107 in a transfer section 111 by the pressing member 106 to be transferred thereonto. The transfer of the third image that is an image from which the liquid component has been removed onto the printing medium 108 can suppress, for example, the curling and cockling of the printing medium 108.

The pressing member 106 preferably has a moderate structural strength from the viewpoints of the accuracy with which the printing medium 108 is conveyed and its durability. A material for the pressing member 106 may be, for example, a metal, ceramic, or a resin. Of those, a metal such as aluminum is preferred from the viewpoint that the metal not only has such rigidity as to be capable of withstanding a stress at the time of transfer and dimensional accuracy, but also alleviates inertia at the time of the operation of the member to improve the control responsiveness thereof

[8] Printing Medium

Known printing media may each be used as the printing medium 108. Examples of the printing medium may include: an elongate product wound into a roll shape; and a sheet-shaped product cut into predetermined dimensions. Examples of a material for the printing medium may include: paper, such as coated paper or plain paper; a film made of a plastic or a metal; a wood plate; and corrugated cardboard.

[9] Printing Medium Conveying Device

The printing medium conveying device 107 that conveys the printing medium 108 conveys the printing medium 108 in the direction of the arrow C. The printing medium conveying device 107 includes a printing medium feeding roller 107a and a printing medium take-up roller 107b. The speed at which the printing medium 108 is conveyed is preferably determined in consideration of a speed required in each step.

(Direct Drawing Type Ink Jet Printing Apparatus)

Figure 4:
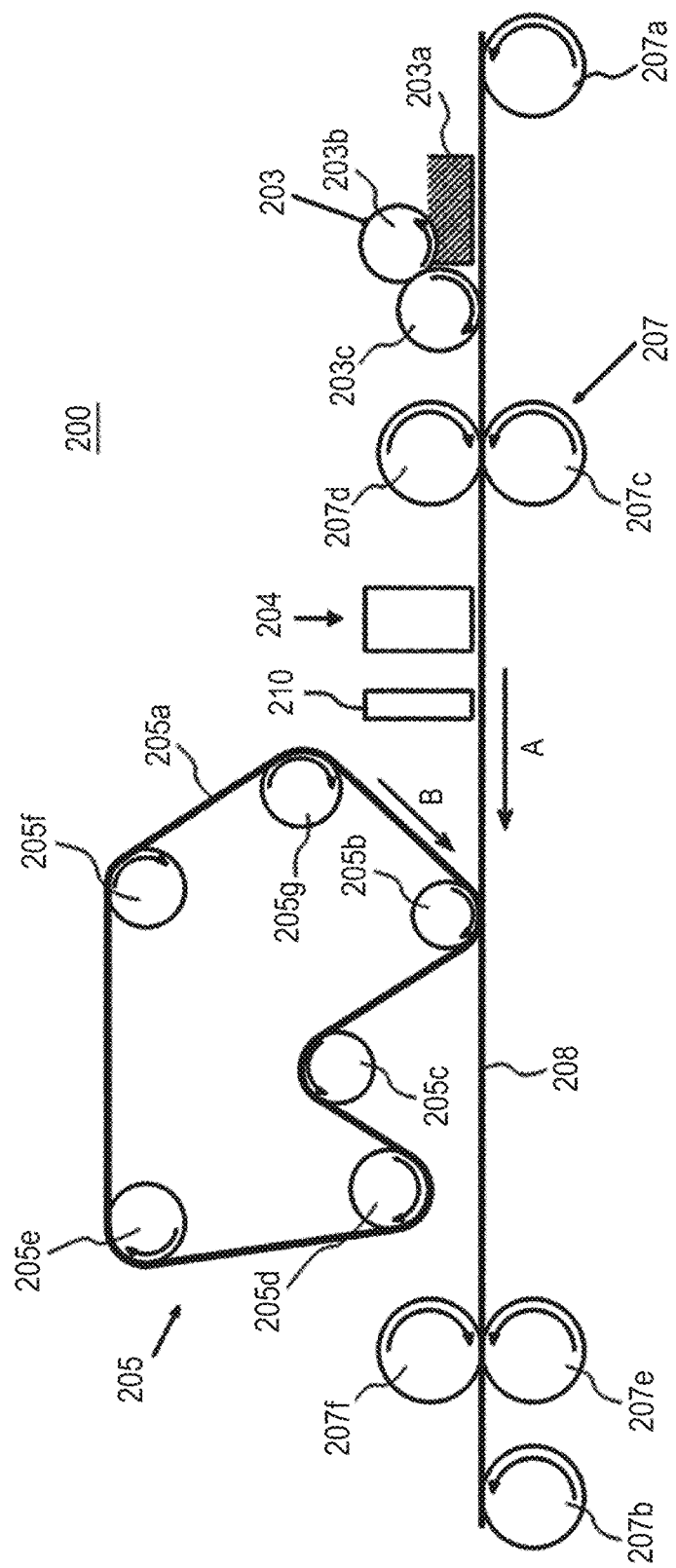
FIG. 4 is a schematic view for illustrating another embodiment of the ink jet printing apparatus of the present invention.

FIG. 4 is a schematic view for illustrating another embodiment of the ink jet printing apparatus according to one aspect of the present invention. The ink jet printing apparatus of the embodiment illustrated in FIG. 4 is a direct drawing type ink jet printing apparatus 200 that directly forms an image on a printing medium. The direct drawing type ink jet printing apparatus 200 is free of the transfer body 101, the support member 102, the pressing member 106, and the transfer body-cleaning member 109 illustrated in FIG. 3. Further, the direct drawing type ink jet printing apparatus 200 directly prints an image on a printing medium 208. The direct drawing type ink jet printing apparatus 200 has the same configuration as that of the transfer type ink jet printing apparatus 100 illustrated in FIG. 3 except the foregoing. A reaction liquid applying device 203, an ink applying device 204, an active energy ray application device 210, and a liquid absorbing device 205 that absorbs a liquid component in a second image with a liquid absorbing member 205a have the same configurations as those of the transfer type ink jet printing apparatus 100 illustrated in FIG. 3. Accordingly, the description of those devices is omitted. In FIG. 4, a reaction liquid accommodating portion is represented by reference symbol 203a, and reaction liquid applying members are represented by reference numerals 203b and 203c.

The liquid absorbing device 205 includes: the liquid absorbing member 205a; and a pressing member 205b that presses the liquid absorbing member 205a against the second image on the printing medium 208. The shapes of the liquid absorbing member 205a and the pressing member 205b are not particularly limited, and the same shapes as those of the liquid absorbing member and the pressing member that can be used in the transfer type ink jet printing apparatus 100 may be used. In FIG. 4, tensioning rollers serving as tensioning members are represented by reference numerals 205c, 205d, 205e, 205f, and 205g. A support member (not shown) that supports the printing medium from below may be arranged in an ink applying section in which an ink is applied to the printing medium 208 by the ink applying device 204. In addition, a support member (not shown) that supports the printing medium from below may be arranged in a liquid component removal section in which the liquid absorbing member 205a is brought into contact with the second image on the printing medium to remove the liquid component.

The configuration of a printing medium conveying device 207 is not particularly limited, and a conveying unit in a known direct drawing type ink jet printing apparatus may be used. The device may be specifically, for example, the printing medium conveying device 207 including a printing medium feeding roller 207a, a printing medium take-up roller 207b, and printing medium conveying rollers 207c, 207d, 207e, and 207f as illustrated in FIG. 4.

<Method of Producing Porous Body>

A method of producing a porous body according to one aspect of the present invention includes: a first step of forming a first film; and a second step of forming a second film having a porous structure. In the first step, a liquid composition (ink) containing a water-soluble polymerizable component A and water is ejected from a printing head of an ink jet system to be applied to a medium M, to thereby form the first film. At this time, the polymerizable component A is dissolved in the first film. In addition, in the second step, an active energy ray is applied to the first film formed in the first step to form the second film having the porous structure. In addition, a moisture concentration "x" (mass %) in the first film and a moisture concentration "y" (mass %) in the second film placed under an environment at a humidity of 95% satisfy a relationship of $0<(y/x)\leq 0.80$. Details about the method of producing a porous body according to one aspect of the present invention are described below.

In the method of producing a porous body according to one aspect of the present invention, so-called polymerization solid-liquid separation, which occurs when the active energy ray is applied to the first film formed with the aqueous liquid composition (aqueous ink) containing the water-soluble polymerizable component A to polymerize the component, is utilized. The polymerization solid-liquid separation is a phenomenon in which the film undergoes a solid-liquid separation into a solid cured product and moisture. As a result of the occurrence of the polymerization solid-liquid separation, the moisture easily escapes from the second film that is the cured product to result in the formation of a film-shaped porous body. Meanwhile, when the polymerization solid-liquid separation does not occur, solid matter or gel, which is solid, is formed, and hence no porous body is formed.

The description of the mechanism via which the polymerization solid-liquid separation occurs is omitted because the inventors of the present invention have assumed that the mechanism is the same as the mechanism described in the ink jet printing method according to one aspect of the present invention described above.

The moisture concentration "x" (mass %) in the first film means a moisture concentration in the first film at the time of the initiation of the polymerization. The moisture concentration "x" (mass %) in the first film is preferably 50 mass % or more, more preferably 60 mass % or more, particularly preferably 65 mass % or more. In addition, the moisture concentration "y" (mass %) in the second film means a moisture concentration in the second film when the second film is brought into an equilibrium state under a high-humidity environment (at a humidity of 95%), and the concentration facilitates experimental measurement simulating a moisture amount at the time of the equilibrium swelling. According to the above-mentioned theoretical background, the achievement of a strict equilibrium swelling state requires direct immersion of the second film that is a cured product in water or the placement thereof under an environment at a humidity of 100%. However, the inventors have found that such operations make it difficult to perform actual measurement because of, for example, the following reasons: the cured product is lost to sight in the water; and it becomes difficult to judge whether or not the film is in the equilibrium state owing to condensation. According to the above-mentioned theory, when the moisture concentration "x" is equal to or more than a moisture concentration at the time of the equilibrium swelling, that is, when "{(moisture concentration at time of equilibrium swelling)/x}≤1" is satisfied, the polymerization solid-liquid separation occurs. However, the moisture concentration "y" is lower than the moisture concentration at the time of the equilibrium swelling, and hence the inventors have revealed that the polymerization solid-liquid separation occurs when a relationship of $(y/x)\leq 0.80$ is satisfied, preferably when a relationship of $(y/x)\leq 0.6$ is satisfied.

The polymerization solid-liquid separation is a phenomenon in which polymerization causes a phase separation between a cured product and a solvent such as water. In the phase separation, however, the mixture of the cured product and the solvent is not completely divided into two parts in a vertical manner, and a microscopic separated structure, typically, a porous body is formed. The porous body produced by the method of producing a porous body according to one aspect of the present invention can be used in the same applications as those of a general porous body. The porous body is suitable as, for example, a filter, an adsorbent, a carrier, a cushioning material, a heat insulator, a light-weight structural body, a low-dielectric constant insulator, and an optical scatterer.

The formation of the porous body may cause whitening or haze at the moment when the first film is cured. The inventors of the present invention have made an investigation, and as a result, have found that when the complex modulus of elasticity of a solid content for forming the second film that is a cured product obtained by curing the first film, more specifically, the complex modulus of elasticity of a structural portion for forming the porous body is less than $10^{7.0}$ Pa, the whitening and the haze along with water removal are alleviated. Meanwhile, when the whitening or the haze is actively utilized, or the porous structure of the porous body is left and utilized even after its drying, the complex modulus of elasticity of the solid content for forming the second film is preferably $10^{7.0}$ Pa or more. In addition, the upper limit value of the complex modulus of elasticity of the solid content for forming the second film is not particularly limited, but the complex modulus of elasticity of the solid content for forming the second film may be set to, for example, $10^{9.0}$ Pa or less.

According to the method of producing a porous body according to one aspect of the present invention, there can be produced a porous body, which is a cured product having whiteness higher than that of a solid or gel, which is solid, produced by the related art. That is, a white porous body out of the porous bodies according to one aspect of the present invention is useful as a colorant for a white coating material or ink.

A white pigment such as titanium oxide has heretofore been mainly used as the colorant for a white coating material or ink. However, the white pigment such as titanium oxide has involved a problem in that its dispersibility is not necessarily satisfactory because the pigment has a large specific gravity, and is hence liable to sediment. In contrast, in the method of producing a porous body according to one aspect of the present invention, an inconvenience such as the above-mentioned sedimentation does not occur because a liquid composition containing a component, which can form a white porous body, under a dissolved state is used. Of course, the white pigment or the like may be added to the liquid composition, but even when the white pigment is added to the liquid composition, the addition amount of the white pigment can be reduced.

According to the method of producing a porous body according to one aspect of the present invention, there can be obtained a porous body, which is a cured product having a refractive index lower than that of the related-art solid or gel, which is solid. Accordingly, the porous body according to one aspect of the present invention, which has a low refractive index, is useful as a material for forming an antireflection film. For example, when a coating layer is formed by coating the surface of a base material or the like with a solid, which is solid, a difference in refractive index between air and the coating layer is large, and hence reflection or the like has become a problem in some cases. To solve the problem, the following methods are available, but it has been impossible to say that the methods are each a simple method: a method including forming a multilayer film or a fluorine-based film; and a method including forming fine unevenness on the surface. In contrast, the use of the porous body according to one aspect of the present invention enables simple formation of an antireflection film that hardly causes a problem such as reflection.

The voids of the porous body can each carry a liquid or a solid. In addition, the porous body is useful as, for example, an absorber, an adsorbent, a flow path, or a filter because a gas or a liquid can pass therethrough. Further, when the ink is applied after the formation of the film-shaped porous body on the medium M, the porous body functions as an ink receiving layer, and hence can receive the ink to carry the ink under a satisfactory state. That is, the porous body according to one aspect of the present invention is suitable as an ink receiving layer capable of receiving an ink (absorbing the ink). In particular, when the film-shaped porous body is formed on the surface of a liquid-nonabsorbable medium on which an image is hardly printed by liquid application or ink application, a coating film can be formed on the surface of the liquid-nonabsorbable medium, or an image can be printed thereon. When the ink receiving layer is formed by using the porous body according to one aspect of the present invention, the thickness of the ink receiving layer is preferably 1 μm or more, the pore diameter thereof is preferably 10 nm or more, and the ink absorption capacity thereof is preferably 3 mL/cm$^2$ or more.

A liquid sample applied to the porous body thus formed can selectively flow in the porous body. Accordingly, the porous body according to one aspect of the present invention is useful as a flow path for a microfluidic device or the like. Further, the porous body is preferably patterned. In addition, when a liquid or a gas containing solid components is passed through the porous body, a solid component larger than the pore diameter of the porous body can be captured and separated. That is, the porous body according to one aspect of the present invention is useful as a separation filter.

Further, the porous body may be used as a cushioning material by being compressed or crushed through the application of mechanical impact. The cushioning material not only merely protects a predetermined article but also is useful as a material for improving texture (touch feeling) at the time of the touch of the surface of the article by being, for example, carried on the surface of the article.

The porous body according to one aspect of the present invention is reduced in weight as compared to a solid or gel, which is solid, because the porous body has the voids therein. The porous body according to one aspect of the present invention may be produced with a 3D printer. The porous body may be suitably produced with a 3D printer of a lamination system that laminates thin films out of such printers. Further, the porous body may be shaped while being, for example, colored with an ink.

The porous body according to one aspect of the present invention has a dielectric constant lower than that of a solid or gel, which is solid, because the porous body has the voids therein. An insulator for an electric circuit is sometimes required to have a small capacitance between itself and its surrounding wiring. Accordingly, the porous body according to one aspect of the present invention is useful as an insulator for an electric circuit or the like. Further, the porous body is preferably patterned. In addition, the porous body according to one aspect of the present invention has a thermal conductivity lower than that of the solid or gel, which is solid, because the porous body has the voids therein. Accordingly, the porous body according to one aspect of the present invention is useful as a heat insulator. Further, the patterning can form a thermal circuit that transfers heat only to a specific path.

The patterned porous body may be produced by, for example, appropriately designing the ejection position of a printing head of an ink jet system or the amount of an ink to be ejected from the printing head. In addition, the curing of the first film in a state in which the amount of its solvent is large forms a porous structure, but the curing of the first film in which the amount of the solvent is reduced to a certain value or less by its drying may not form any porous structure.

The patterned porous body may be formed by applying the active energy ray to the first film, which is patterned under a state in which the amount of the solvent is large, through utilization of such phenomenon. Further, the application of the active energy ray after the drying of an uncured portion can produce a structural body having, in one and the same film, a portion having a porous structure and a solid portion.

The mechanism via which the polymerizable component A is polymerized is, for example, radical polymerization or ionic polymerization, and is not particularly limited. However, the radical polymerization is preferred because the polymerization is hardly inhibited by water. The polymerizable component A preferably includes an acrylamide structure that is highly resistant to hydrolysis. One driving force for the polymerization solid-liquid separation is an increase in molecular weight by the polymerization. Accordingly, the molecular weight of the polymerizable component A is preferably as small as possible because a change in osmotic pressure by the polymerization is large. Specifically, the molecular weight of the polymerizable component A is preferably 800 or less.

It has been known that a phase separation comes in binodal decomposition that requires nucleation and nuclear growth, and spinodal decomposition that does not require any nucleation or nuclear growth and spontaneously advances. Herein, the description of the spinodal decomposition, and a relationship between a spinodal curve and polymerization solid-liquid phase separation is omitted because the decomposition and the relationship have been described in the ink jet printing method according to one aspect of the present invention described above.

The polymerizable component A preferably has a plurality of polymerizable functional groups in a molecule thereof. That is, the polymerizable component A is preferably a polyfunctional monomer. The use of the polyfunctional monomer having a plurality of polymerizable functional groups in a molecule thereof as the polymerizable component A can improve the dynamic characteristics of the cured product (second film) to be formed. In addition, the polymerizable component A is preferably a polyfunctional monomer satisfying a relationship of "molecular weight/number of polymerizable functional groups≤150." The use of the polyfunctional monomer satisfying the above-mentioned relationship as the polymerizable component A enables the use of a crosslinking reaction as a driving force for the polymerization solid-liquid separation, and can increase the crosslinking density of the cured product.

The pore diameter of the porous body is preferably 50 nm or more, more preferably 100 nm or more. When the pore diameter is set to 50 nm or more, the whiteness of the porous body can be improved. The pore diameter of the porous body is preferably 1 μm or less because when the pore diameter is excessively large, the scattering of light by the porous body tends to weaken.

The porous body is formed by the polymerization of the polymerizable component A dissolved in the first film. Accordingly, there is no need to incorporate solid matter into the liquid composition. Of course, the solid matter may be incorporated into the liquid composition in accordance with applications, but the solid matter, such as a colorant, such as a pigment or a dye, a white pigment, or any other filler, may not be incorporated into the liquid composition. Titanium oxide to be used as the pigment of a white ink for ink jet printing may easily sediment to reduce the stability of the ink. According to the method of producing a porous body according to one aspect of the present invention, a white porous body can be obtained even when a liquid composition free of any solid matter is used. That is, in the method of producing a porous body according to one aspect of the present invention, the following aspect is also preferred: a liquid composition that is substantially free of any colorant or white pigment is used.

The moisture concentration "x" (mass %) in the first film and the moisture concentration "y" (mass %) in the second film brought into an equilibrium state under the environment at a humidity of 95% may each be calculated by measuring the mass of the corresponding film. Each of the moisture concentrations is defined by the expression "(mass of liquid component/mass of film)×100." However, a solid that has been present since before the application of the active energy ray is not included in the "mass of film." This is because the solid that has been originally present since before the application of the active energy ray does not contribute to the polymerization solid-liquid separation. Meanwhile, a component that has been present since before the application of the active energy ray and is dissolved in the water even after the application is included in the "mass of liquid component." For example, a pigment is not included in the "mass of film." In addition, a water-soluble solvent or a surfactant is included in the "mass of liquid component." A water-soluble polymerization initiator or the like is included in the "mass of liquid component" because only an extremely small amount thereof is typically incorporated into a polymerized molecular chain, and most thereof is water-soluble even after the application of the active energy ray.

With regard to the moisture concentration "y" (mass %) in the second film placed under the environment at a humidity of 95%, moisture concentrations when cured products obtained by curing inks having various moisture concentrations are placed under the environment at a humidity of 95% to reach equilibrium are desirably calculated. The temperature of the environment at a humidity of 95% only needs to be set to a temperature at the time of the formation of the film.

The complex modulus of elasticity of the solid content for forming the second film may be measured in accordance with the following procedure. A rheometer that can apply an active energy ray such as ultraviolet light (UV) may be used as a measuring apparatus. First, parallel plates are used as jigs, and the liquid composition is interposed between the parallel plates. Next, the active energy ray is applied to cure the liquid composition, and then a gap between the plates is reduced to compress the liquid composition (cured product). When polymerization solid-liquid separation occurs, the water of the composition is discharged to the outside, and hence the solid content is concentrated in the gap. When the cured product is compressed to a gap corresponding to a solid content amount in the liquid composition, the compression is stopped, and its complex modulus of elasticity is measured in a vibration mode. Conditions for the vibration mode are as follows: a strain amount of 1% and a frequency of 30 Hz. The complex modulus of elasticity is defined by the following equation. A liquid composition simulating composition immediately before the application of the active energy ray is used as the liquid composition. Of course, when the actually formed cured product (second film) can be prepared, the complex modulus of elasticity may be measured by using the cured product.

$$\text{Complex modulus of elasticity} = \{(\text{storage modulus of elasticity})^2 + (\text{loss modulus of elasticity})^2\}^{1/2}$$

The lower critical solution temperature of the polymerizable component A and a moisture concentration "z" at the lower critical solution temperature of the polymerizable component A may be measured in accordance with the following procedure. First, aqueous solutions of the polymerizable component A having various concentrations are prepared. Next, the dissolved states of the polymerizable component A in the aqueous solutions are observed while the temperatures of the solutions are changed with, for example, a bath capable of heating and cooling. An aqueous solution of the polymerizable component A having a lower critical solution temperature undergoes clouding when its temperature becomes a predetermined value or more. The temperature at which such clouding occurs is a "clouding point." Then, a clouding point that becomes a local minimum out of the clouding points measured for the aqueous solutions having various concentrations is adopted as the "lower critical solution temperature (° C.)." Further, the moisture concentration of the aqueous solution having the "lower critical solution temperature" is adopted as the "moisture concentration "z" (mass %)."

A temperature at the time of the measurement of the lower critical solution temperature only needs to be set to from 5° C. to 80° C. Even if the lower critical solution temperature is less than 5° C., and hence the moisture concentration "z" cannot be determined, a magnitude relationship between the moisture concentration "x" and the moisture concentration "z" can be judged. The moisture concentration "x" is a value defined under a state in which the polymerizable component A is dissolved in the first film. Accordingly, even when the lower critical solution temperature is less than 5° C., as long as the moisture concentration point which is smaller than the moisture concentration "x" and at which the component is insolubilized is present, the moisture concentration "z" that is even smaller than the insolubilizing point is present, and hence a relationship of x≥z is satisfied. Similarly, when the moisture concentration "x" is less than 0.95, z≤0.95 is satisfied. When the ink contains the plurality of kinds of polymerizable components A each having a lower critical solution temperature, the moisture concentration "z" is measured for each of the polymerizable components A, and the arithmetic average of values obtained by weighting the measured values by the contents of the respective components is redefined as the "moisture concentration "z"." In the case of, for example, an ink containing a polymerizable component A1, which provides a moisture concentration "z" of 50 mass %, at a content of 20 mass % and a polymerizable component A2, which provides a moisture concentration "z" of 80 mass %, at a content of 10 mass %, the moisture concentration "z" (mass %) of the polymerizable components A in the ink is calculated from the following equation.

$$\{(0.5 \times 0.2 + 0.8 \times 0.1)/0.3\} \times 100 = 60 \text{ mass \%}$$

(Active Energy Ray-Curable Liquid Composition for Ink Jet)

A liquid composition containing the water-soluble polymerizable component A and water is used as the liquid composition. That is, the liquid composition to be used in the method of producing a porous body according to one aspect of the present invention is an active energy ray-curable liquid composition (aqueous ink) for ink jet.

[Polymerizable Component a, Polymerization Initiator, Coloring Material, and Solvent]

With regard to the kinds of the polymerizable component A, a polymerization initiator, a coloring material, and the solvent in the liquid composition, the same materials as the polymerizable component A, the polymerization initiator, the coloring material, and the solvent described in the foregoing description of the ink jet printing method may be used. In addition, the contents of those components are the same as the contents of the polymerizable component A, the polymerization initiator, the coloring material, and the solvent described in the foregoing description of the ink jet printing method except that the contents are set with respect to the total mass of the liquid composition.

(Reaction Liquid)

In the method of producing a porous body according to one aspect of the present invention, a reaction liquid containing a component that is brought into contact with the liquid composition to increase the viscosity of the liquid composition may be used. The increase in viscosity of the liquid composition includes: a case in which the components in the liquid composition chemically react with, or physically adsorb to, each other to increase the viscosity of the liquid composition; and a case in which the components in the liquid composition aggregate to locally increase the viscosity. The component for increasing the viscosity of the liquid composition has the following effect: the component reduces the fluidity of the liquid composition on a printing medium to suppress bleeding and beading. A polyvalent metal ion, an organic acid, a cationic polymer, porous fine particles, and the like may each be used as the component for increasing the viscosity of the liquid composition. Of those, the polyvalent metal ion and the organic acid are preferred. The content of the component for increasing the viscosity of the liquid composition in the reaction liquid is preferably 5 mass % or more with respect to the total mass of the reaction liquid.

With regard to the kinds of the polyvalent metal ion and the organic acid, the same materials as the polyvalent metal ion and the organic acid described in the foregoing description of the ink jet printing method may be used.

In addition, the same materials as the water, the organic solvent, the surfactant, and the viscosity modifier described in the foregoing description of the ink jet printing method may be used as water, an organic solvent, a surfactant, and a viscosity modifier to be incorporated into the reaction liquid.

A component, such as a curing component that is cured by an active energy ray or a polymerization initiator, may be further incorporated into the reaction liquid.

<Apparatus for Producing Porous Body and Method of Producing Porous Body>

An apparatus for producing a porous body according to one aspect of the present invention includes: a unit configured to perform a first step of forming a first film; and a unit configured to perform a second step of forming a second film having a porous structure. The unit configured to perform the first step is a unit for performing the first step of ejecting a liquid composition containing a water-soluble polymerizable component A and water from a printing head of an ink jet system to apply the liquid composition to a medium M, to thereby form the first film. At this time, the polymerizable component A is dissolved in the first film. The unit configured to perform the second step is a unit for performing the second step of applying an active energy ray to the first film to form the second film having the porous structure. In addition, as described above, a moisture concentration "x" (mass %) in the first film and a moisture concentration "y" (mass %) in the second film placed under an environment at a humidity of 95% satisfy a relationship of $0<(y/x)\leq 0.80$.

The method of producing a porous body according to one aspect of the present invention preferably further includes a third step of drying the second film to form a third film having a porous structure from which the water has been removed. Herein, in the removal of the water from the porous structure, it is not necessarily required to remove all the water present in the pores of the porous structure, and at least part of the water only needs to be removed. In addition, at the time of the drying of the second film, a liquid component (e.g., an organic solvent) except the water may be removed together with the water. With regard to a method of drying the second film, the second film may be dried by natural drying, or may be dried by at least one of heating or air blowing. Of those, the drying of the second film by at least one of heating or air blowing is preferred for removing the water from the porous structure in a short time period. When the second film is dried by at least one of heating or air blowing, the apparatus for producing a porous body includes at least one of a heat drying device or an air blowing device.

In addition, the third film is preferably white. When the third film is white, a white image can be formed without use of any white pigment.

In addition, the third film is preferably capable of absorbing an ink. When the third film is capable of absorbing the ink, the formation of the third film on the surface of a nonabsorbable medium having no ink absorbability can cause the nonabsorbable medium to hold the ink.

A product obtained by appropriately improving an ink jet printing apparatus including a printing head of an ink jet system may be used as the apparatus for producing a porous body according to one aspect of the present invention. Examples of the applicable ink jet printing apparatus may include: (i) a direct drawing type ink jet printing apparatus that directly forms an image on a printing medium; and (ii) a transfer type ink jet printing apparatus that transfers an image formed on a transfer body onto the printing medium. The configurations of the direct drawing type ink jet printing apparatus and the transfer type ink jet printing apparatus are the same as those of the direct drawing type and transfer type ink jet printing apparatus described in the above-mentioned ink jet printing apparatus except that the ink applying device in each of the apparatus is changed to a liquid composition applying device. In addition, the configuration of the liquid composition applying device is the same as that of the ink applying device except that the ink of the device is changed to the liquid composition.

Figure 5:
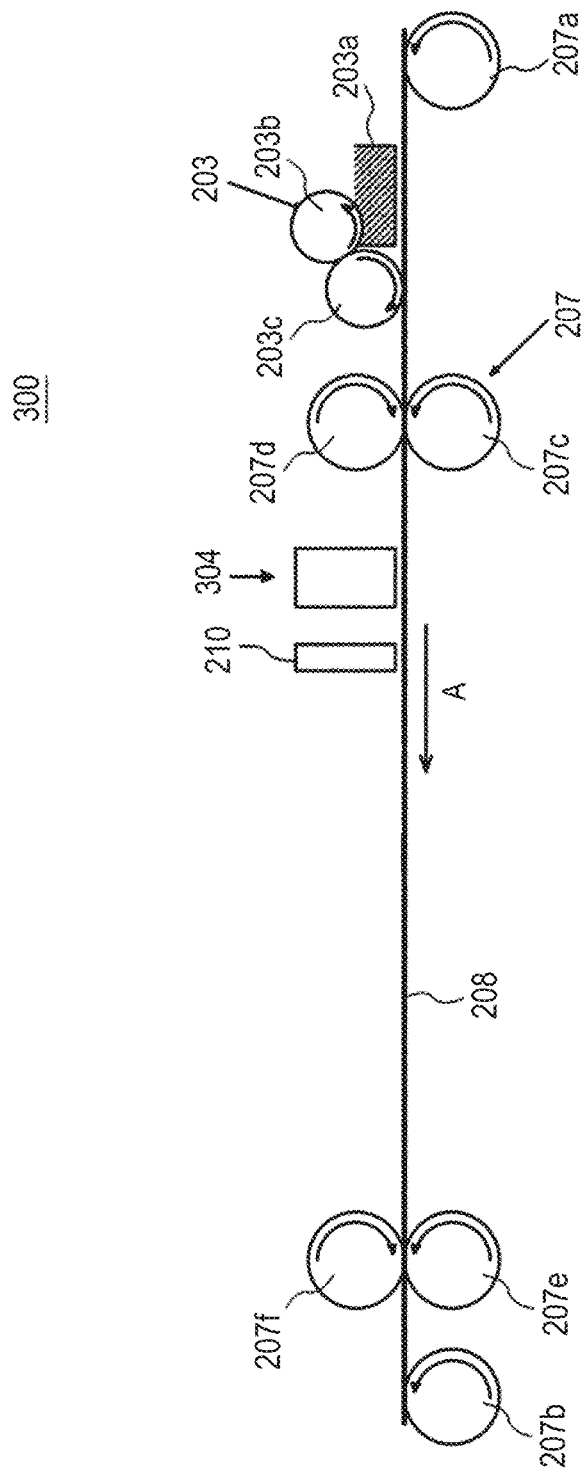
FIG. 5 is a schematic view for illustrating one embodiment of an apparatus for producing a porous body of the present invention.

The apparatus for producing a porous body according to one aspect of the present invention is described by taking a direct drawing type ink jet printing apparatus illustrated in FIG. 5 as an example.

(Direct Drawing Type Ink Jet Printing Apparatus)

FIG. 5 is a schematic view for illustrating one embodiment of a direct drawing type ink jet printing apparatus. A direct drawing type ink jet printing apparatus 300 of the embodiment illustrated in FIG. 5 is free of any liquid absorbing device and includes a liquid composition applying device 304 instead of the ink applying device, and its reaction liquid contains a reagent that reacts with the liquid composition of the device. The direct drawing type ink jet printing apparatus 300 illustrated in FIG. 5 has the same configuration as that of the direct drawing type ink jet printing apparatus 200 illustrated in FIG. 4 except the foregoing. Accordingly, the reaction liquid applying device 203, the liquid composition applying device 304 (ink applying device 204), the printing medium conveying device 207, and the active energy ray application device 210 have the same configurations as those of the corresponding devices of the direct drawing type ink jet printing apparatus 200 illustrated in FIG. 4. Accordingly, the description of those devices is omitted.

After the reaction liquid has been applied from the reaction liquid applying device 203 to the printing medium 208 moving in the direction of the arrow A, the liquid composition is applied from the liquid composition applying device 304 to form the first film on the printing medium 208. Next, ultraviolet light is applied from the active energy ray application device 210 to the first film on the printing medium 208 to form the second film (porous body) having the porous structure. A support member (not shown) that supports the printing medium from below may be arranged in a liquid composition applying section in which the liquid composition is applied to the printing medium 208 by the liquid composition applying device 304.

EXAMPLES

Next, the present invention is described in more detail by way of Examples and Comparative Examples. However, the present invention is by no means limited to Examples below without departing from the gist of the present invention. In the description of the amounts of components, "part(s)" and "%" are by mass unless otherwise specified.
<<Examples Concerning Ink Jet Printing Method and Ink Jet Printing Apparatus According to One Aspect of the Present Invention>>
<Ink Jet Printing Apparatus Preparation (1.1)>

A transfer type ink jet printing apparatus described below was prepared. A transfer body having the following configuration was fixed to a support member with an adhesive, and was conveyed at a conveyance speed of 600 mm/s. The temperature and humidity of an environment in which an image was formed were set to 23° C. and 60% RH, respectively.
(Transfer Body)

An elastic layer having a thickness of 0.3 mm was formed by coating a PET sheet having a thickness of 0.5 mm with a silicone rubber (product name: "KE-12", manufactured by Shin-Etsu Chemical Co., Ltd.). Glycidoxypropyltriethoxysilane and methyltriethoxysilane were mixed at a molar ratio of 1:1, and the mixture was heated to reflux to provide a condensate. The resultant condensate and a photocationic polymerization initiator (product name: "SP-150", manufactured by Adeka Corporation) were mixed to prepare a mixture. The surface of the elastic layer was subjected to atmospheric-pressure plasma treatment so that its contact angle with water became 10° or less. After that, the above-mentioned mixture was applied onto the elastic layer. Next, the mixture was irradiated with UV (high-pressure mercury lamp, cumulative exposure amount: 5,000 mJ/cm$^2$) and thermally cured (at 150° C. for 2 hours) to be formed into a film. Thus, a transfer body in which a surface layer having a thickness of 0.5 μm was formed on the elastic body was obtained.
<Ink Production [1.1]>
(Preparation of Pigment Dispersion Liquid 1.1)

10 Parts of Pigment Red 122, 15 parts of a resin (pigment dispersant) aqueous solution, and 75 parts of ion-exchanged water were mixed, and the mixture was loaded into a batch-type vertical sand mill (manufactured by IMEX Co., Ltd.). An aqueous solution (solid content: 20%) obtained by neutralizing a styrene-acrylic acid-ethyl acrylate copolymer (acid value: 150 mgKOH/g, weight-average molecular weight: 8,000) with a neutralizer (KOH) was used as the resin (pigment dispersant) aqueous solution. The sand mill was filled with 200 parts of zirconia beads each having a diameter of 0.3 mm, and the mixture was subjected to dispersion treatment for 5 hours while being cooled with water. Thus, a dispersion liquid was obtained. The resultant dispersion liquid was subjected to a centrifuge so that its coarse particles were removed. Thus, a magenta pigment dispersion liquid [1.1] having a pigment concentration of 10% was obtained.
(Inks 1.1 to 1.6)

The following respective components were mixed to provide inks 1.1 to 1.6. In the following components, the term "ACETYLENOL EH" represents the product name of a nonionic surfactant (ethylene oxide adduct of acetylene glycol) manufactured by Kawaken Fine Chemicals Co., Ltd. The lower critical solution temperature of the polymerizable component A-3 was 46° C., and the moisture concentration "z" at the lower critical solution temperature was 50%. In addition, the lower critical solution temperature of the polymerizable component A-14 was 41° C., and the moisture concentration "z" at the lower critical solution temperature was 65%.

Pigment dispersion liquid 1.1: 20%
Polymerizable component A-3: amount (%) shown in Table 1.1
Polymerizable component A-14: amount (%) shown in Table 1.1
Polymerization initiator A: amount (%) shown in Table 1.1
ACETYLENOL EH: 1%
Ion-exchanged water: balance (amount set so that total amount of the components becomes 100%)
(Ink 1.7)
The following respective components were mixed to provide an ink 1.7. None of the polymerizable component A-1 and the polymerizable component A-15 had any lower critical solution temperature.
Pigment dispersion liquid 1.1: 20%
Polymerizable component A-1: 18%
Polymerizable component A-15: 2%
Polymerization initiator A: 2%
ACETYLENOL EH: 1%
Ion-exchanged water: balance (amount set so that total amount of the components becomes 100%)

TABLE 1-1

|  | Polymerizable component A (%) | | | | Polymerization initiator A |
| --- | --- | --- | --- | --- | --- |
|  | A-3 | A-14 | A-1 | A-15 | (%) |
| Ink 1-1 | 9 | 1 | — | — | 0.5 |
| Ink 1-2 | 18 | 2 | — | — | 1.0 |

TABLE 1-1-continued

|  | Polymerizable component A (%) | | | | Polymerization initiator A (%) |
| --- | --- | --- | --- | --- | --- |
|  | A-3 | A-14 | A-1 | A-15 |  |
| Ink 1-3 | 36 | 4 | — | — | 2.0 |
| Ink 1-4 | 54 | 6 | — | — | 3.0 |
| Ink 1-5 | 36 | 4 | — | — | 2.0 |
| Ink 1-6 | 36 | 4 | — | — | 2.0 |
| Ink 1-7 | — | — | 18 | 2 | 1.0 |

<Image Printing (1.1)>

Examples 1.1 to 1.4 and Comparative Examples 1.1 to 1.3

A printing head (nozzle array density: 1,200 dpi), which ejected an ink by an on-demand system with an electrothermal conversion element, was driven at a frequency of 14.173 kHz to apply each ink shown in Table 1.2 at 20 g/m² to the transfer body. Thus, a first image was formed. The first image was a solid image having a width of 32 mm and a length (in the moving direction of a printing medium) of 100 mm. The printing head is not a printing head of a so-called serial system but a printing head of a so-called line system in which its nozzle array is fixed substantially perpendicularly to the conveyance direction of the printing medium.

Ultraviolet light was applied to the first image formed on the transfer body with a UV-LED application device (manufactured by Ushio Inc., product name: "UV-LED L60II", wavelength: 395 nm) to form a second image. The cumulative light quantity of the device was set to 200 mJ/cm². In each of Examples 1.1 to 1.3 and Comparative Example 1.3, the ultraviolet light was applied immediately after the application of the ink to the transfer body. Meanwhile, in each of Example 1.4, and Comparative Examples 1.1 and 1.2, after the application of the ink to the transfer body, air was blown to dry the first image, and then the ultraviolet light was applied.

A liquid absorbing body (product name: "POREFLON hydrophilic film HPW-020-30", manufactured by Sumitomo Electric Fine Polymer, Inc.) was brought into contact with the second image on the transfer body to remove at least part of moisture in the second image. Thus, a third image was formed. The liquid absorbing body is a 30-micrometer thick hydrophilic PTFE film having a porous structure (pore diameter: 200 nm). Such a roller having a diameter of 100 mmφ that a region ranging from its surface to a depth of 10 mm included sponge was used as a pressing member, and the liquid absorbing body was brought into contact with the second image at a pressure of 100 gf/cm² with the member to press the image. A nip width between the liquid absorbing body and the second image was set to 20 mm, and a contact time therebetween was set to 33 ms.

The third image thus formed was brought into pressure contact with the printing medium to be transferred thereonto. Thus, a fourth image was formed on the printing medium. Coated paper (product name: "AURORA COAT PAPER", manufactured by Nippon Paper Industries Co., Ltd., basis weight: 127.9 g/m²) was used as the printing medium, and its conveyance speed was set to 600 mm/s. Such a roller having a diameter of 150 mmφ that a region ranging from its surface to a depth of 0.5 mm included a rubber was used as a transfer member, and the printing medium was brought into contact with the third image at a pressure of 10 kgf/cm² with the member to press the image. A nip width between the medium and the third image was set to 20 mm, and a contact time therebetween was set to 33 ms.

<Evaluation (1.1)>

The mass of the first image on the transfer body at an ultraviolet light application position was measured under a state in which the ultraviolet light was not applied. It was recognized that in each of Examples and Comparative Examples, the polymerizable component A did not precipitate, and was hence in the state of being dissolved in the first image. Next, the first image was completely dried with an oven, and the moisture concentration "x" was measured and calculated from its reduced mass. Comparison between the masses of the first image before and after the complete drying with the oven showed that the moisture concentration "x" of the first image when the first image was not dried before the ultraviolet light application (Examples 1.1 to 1.3 and Comparative Example 1.3) was the same as the moisture concentration of the used ink. Accordingly, the moisture concentration "x" of the first image formed in each of Examples 1.1 to 1.3 and Comparative Example 1.3 was set to the moisture concentration of the used ink. The results are shown in Table 1.2.

Next, the second image was placed in a test chamber corresponding to an environment at 23° C. and a humidity of 95% RH, and was left to stand for 3 days. The mass of the second image after the standing and the mass after the complete drying with the oven were measured, and the value of the ratio "y/x" was calculated. The results are shown in Table 1.2.

(Moisture Removability)

The masses of the second image and the third image were measured, and a "water removal ratio (%)" serving as the amount of the moisture removed with the liquid absorbing body was calculated. In addition, moisture removability was evaluated in accordance with the following evaluation criteria. The results are shown in Table 1.2.

A: The water removal ratio was 85% or more.

B: The water removal ratio was 75% or more and less than 85%.

C: The water removal ratio was 65% or more and less than 75%.

D: The water removal ratio was less than 65%.

(Curling (Reference Evaluation))

The printing medium having formed thereon the fourth image was left to stand for 1 day. The printing medium after the standing was visually observed, and the curling of the printing medium was evaluated in accordance with the following evaluation criteria. The results are shown in Table 1.2.

In each of Examples and Comparative Examples, the result is merely a reference evaluation because the transfer was performed after the removal of at least part of the moisture with the liquid absorbing body, and hence the curling is alleviated as compared to the case where a direct drawing type ink jet printing apparatus is used.

A: The printing medium was substantially free from curling.

B: The printing medium slightly curled.

C: The printing medium curled, but the curling was at an allowable level.

D: The printing medium strongly curled, and hence the curling was at an unallowable level.

TABLE 1-2

| | Ink | x (%) | y/x | z (%) | Water removal ratio (%) | Moisture removability | Curling (reference evaluation) |
|---|---|---|---|---|---|---|---|
| Example 1-1 | Ink 1-1 | 90 | 0.49 | 52 | 90 | A | B |
| Example 1-2 | Ink 1-2 | 80 | 0.44 | 52 | 92 | A | A |
| Example 1-3 | Ink 1-3 | 59 | 0.53 | 52 | 87 | A | A |
| Example 1-4 | Ink 1-4 | 39 | 0.68 | 52 | 76 | B | B |
| Comparative Example 1-1 | Ink 1-5 | 29 | 0.85 | 52 | 60 | D | B |
| Comparative Example 1-2 | Ink 1-6 | 18 | 1.12 | 52 | 41 | D | B |
| Comparative Example 1-3 | Ink 1-7 | 80 | 0.95 | — | 50 | D | D |

<Ink Jet Printing Apparatus Preparation (1.2)>

A direct drawing type ink jet printing apparatus having a configuration illustrated in FIG. 4 was prepared. A PET film subjected to hydrophilic treatment (product name: "TETORON (trademark) easy-adhesion-treated PET film UII-92W", thickness: 125 μm) was used as a printing medium, and its conveyance speed was set to 600 mm/s. The temperature and humidity of an environment in which an image was formed were set to 23° C. and 60% RH, respectively.

<Ink Production (1.2)>

(Inks 1.8 to 1.14)

Inks 1.8 to 1.14 were each obtained in the same manner as in the above-mentioned section "Ink Production (1.1)" except that composition shown in Table 1.3 was adopted. The lower critical solution temperature of the polymerizable component A-16 was 54° C., and the moisture concentration "z" at the lower critical solution temperature was 96%.

TABLE 1-3

| | Polymerizable component A (%) | | | | | | Polymerization initiator A (%) |
|---|---|---|---|---|---|---|---|
| | A-3 | A-14 | A-1 | A-15 | A-16 | A-7 | |
| Ink 1-8 | 18 | 2 | — | — | — | — | 1.0 |
| Ink 1-9 | 20 | — | — | — | — | — | 1.0 |
| Ink 1-10 | — | — | — | — | 20 | — | 1.0 |
| Ink 1-11 | — | 20 | — | — | — | — | 1.0 |
| Ink 1-12 | — | — | — | — | — | 20 | 1.0 |
| Ink 1-13 | — | — | 18 | 2 | — | — | 1.0 |
| Ink 1-14 | — | — | — | 20 | — | — | 1.0 |
| Ink 1-15 | — | — | 20 | — | — | — | 1.0 |

<Image Printing (1.2)>

Examples 1.5 to 1.8 and Comparative Examples 1.4 to 1.6

A second image was directly formed on the printing medium in the same manner as in the case of each of Examples 1.1 to 1.4 and Comparative Examples 1.1 to 1.3 described above except that the above-mentioned direct drawing type ink jet printing apparatus was used (moisture removal with the liquid absorbing body was not performed).

<Evaluation (1.2)>

The moisture concentration "x" was measured and calculated in the same manner as in the above-mentioned section "Evaluation (1.1)," and the value of the ratio "y/x" was calculated. The results are shown in Table 1.4. It was recognized that in each of Examples and Comparative Examples, the polymerizable component A did not precipitate, and was hence in the state of being dissolved in the first image.

(Complex Modulus of Elasticity)

The complex modulus of elasticity of the second image (cured product after the ultraviolet light application) formed in each of Examples 1.5 to 1.9 was measured with a rheometer (product name: "MCR302", manufactured by Anton Paar GmbH). The results are shown in Table 1.4.

(Moisture Removability)

The dry state of the second image after the lapse of 5 minutes from its formation was recognized by finger touching, and moisture removability was evaluated in accordance with the following evaluation criteria. The results are shown in Table 1.4.

A: The image was substantially dry.
B: Moisture was felt, but was slight.
C: The image was moist, but the moisture was at an allowable level.
D: The image was wet, and the wetting was at an unallowable level.

(Curling)

The printing medium having formed thereon the second image was left to stand for 1 day. The printing medium after the standing was visually observed, and the curling of the printing medium was evaluated in accordance with the following evaluation criteria. The results are shown in Table 1.4.

A: The printing medium was substantially free from curling.
B: The printing medium slightly curled.
C: The printing medium curled, but the curling was at an allowable level.
D: The printing medium strongly curled, and hence the curling was at an unallowable level.

(Whiteness)

The second image formed in each of Examples 1.5 to 1.9 was visually observed after the lapse of 30 minutes from the formation. Then, the image was compared to the first image before the ultraviolet light application, and whether or not the tinge of the second image changed to improve the whiteness thereof was evaluated. The results are shown in Table 1.4.

TABLE 1-4

| | Ink | x (%) | y/x | z (%) | Complex modulus of elasticity (Pa) | Moisture removability | Curling | Whiteness |
|---|---|---|---|---|---|---|---|---|
| Example 1-5 | Ink 8 | 80 | 0.44 | 52 | $10^{6.1}$ | A | A | No change |
| Example 1-6 | Ink 9 | 80 | 0.40 | 50 | $10^{6.8}$ | A | A | No change |
| Example 1-7 | Ink 10 | 80 | 0.75 | 96 | $10^{6.0}$ | C | C | No change |
| Example 1-8 | Ink 11 | 80 | 0.50 | 65 | $10^{7.1}$ | A | A | White |
| Example 1-9 | Ink 12 | 80 | 0.64 | — | $10^{7.5}$ | B | B | White |
| Comparative Example 1-4 | Ink 13 | 80 | 0.95 | — | — | D | D | — |
| Comparative Example 1-5 | Ink 14 | 80 | 0.93 | — | — | D | D | — |
| Comparative Example 1-6 | Ink 15 | 80 | 0.96 | — | — | D | B | — |

<Ink Production (1.3)>
(Ink 1.15)

A yellow pigment dispersion liquid 1.2 was prepared in the same manner as in the case of the above-mentioned pigment dispersion liquid 1.1 except that Pigment Yellow 74 was used instead of Pigment Red 122. Then, a yellow ink 1.15 was obtained in the same manner as in the case of the above-mentioned ink 1.8 (magenta ink) except that the yellow pigment dispersion liquid 1.2 thus prepared was used instead of the magenta pigment dispersion liquid 1.1.

<Image Printing (1.3)>

Example 1.9

A second image was directly formed on the printing medium in the same manner as in Example 1.5 described above except that the ink 1.15 was applied onto a solid image formed with the ink 1.8 to form a lattice-shaped image. In each of the magenta solid image and the yellow lattice-shaped image, an ink shooting amount per unit area of a printing section was set to 5 g/m².

Comparative Example 1.7

A second image was directly formed on the printing medium in the same manner as in Example 1.9 described above except that the first image was dried with hot air for 10 seconds before the ultraviolet light application.
<Evaluation (1.3)>
(Bleeding)

The images (second images) formed in Example 1.9 and Comparative Example 1.7 were each observed with an optical microscope, and a state in which yellow and magenta colors mixed with each other near a lattice was observed. As a result, it was found that while the colors were substantially free from mixing with each other in the image formed in Example 1.9, the colors mixed with each other (bleeding occurred) in the image formed in Comparative Example 1.7.
<<Examples Concerning Method of Producing Porous Body and Production Apparatus for Porous Body According to One Aspect of the Present Invention>>
<Ink Jet Printing Apparatus Preparation (2.1)>

A direct drawing type ink jet printing apparatus having a configuration illustrated in FIG. 5 was prepared. A PET film subjected to hydrophilic treatment (product name: "TETORON (trademark) easy-adhesion-treated PET film UII-92W", thickness: 125 μm) was used as a printing medium, and its conveyance speed was set to 600 mm/s. The temperature and humidity of an environment in which a porous body was formed were set to 23° C. and 60% RH, respectively.
<Production of Ink (Liquid Composition)>
(Inks 2.1 to 2.5)

The following respective components were mixed to provide inks 2.1 to 2.5. In the following components, the term "ACETYLENOL EH" represents the product name of a nonionic surfactant (ethylene oxide adduct of acetylene glycol) manufactured by Kawaken Fine Chemicals Co., Ltd. The lower critical solution temperature of the polymerizable component A-14 was 41° C., and the moisture concentration "z" at the lower critical solution temperature was 65%. The value of the ratio "molecular weight/number of polymerizable functional groups" of the polymerizable component A-14 was 156, and the value of the ratio "molecular weight/number of polymerizable functional groups" of the polymerizable component A-7 was 88.

polymerizable component A-14: amount (%) shown in Table 2.1
polymerizable component A-1: amount (%) shown in Table 2.1
polymerizable component A-15: amount (%) shown in Table 2.1
polymerizable component A-7: amount (%) shown in Table 2.1
Polymerization initiator A: amount (%) shown in Table 2.1
ACETYLENOL EH: 1%
Ion-exchanged water: balance (amount set so that total amount of the components becomes 100%)

TABLE 2.1

| | Polymerizable component A (%) | | | | Polymerization initiator A (%) |
|---|---|---|---|---|---|
| | A-14 | A-1 | A-15 | A-7 | |
| Ink 2.1 | 10 | — | — | — | 0.5 |
| Ink 2.2 | 20 | — | — | — | 1.0 |
| Ink 2.3 | — | — | — | 30 | 1.5 |
| Ink 2.4 | — | — | 20 | — | 1.0 |
| Ink 2.5 | — | 18 | 2 | — | 1.0 |

<Porous Body Production (2.1)>

Examples 2.1 to 2.5 and Comparative Examples 2.1 to 2.7

A printing head (nozzle array density: 1,200 dpi), which ejected an ink by an on-demand system with an electrothermal conversion element, was driven at a frequency of 14.173 kHz to apply each ink shown in Table 2.2 at 20 g/m² to the printing medium. Thus, a first film was formed. The first film was a so-called solid image having a width of 32 mm and a length (in the moving direction of a printing medium) of 100 mm. The printing head is not a printing head of a so-called serial system but a printing head of a so-called line system in which its nozzle array is fixed substantially perpendicularly to the conveyance direction of the printing medium.

Ultraviolet light was applied to the first film formed on the printing medium with a UV-LED application device (manufactured by Ushio Inc., product name: "UV-LED L60II", wavelength: 395 nm) to form a second film. The cumulative light quantity of the device was set to 200 mJ/cm². In each of Examples 2.1, 2.2, and 2.5, and Comparative Examples 2.6 and 2.7, the ultraviolet light was applied immediately after the application of the ink to the printing medium. Meanwhile, in each of Examples 2.3 and 2.4, and Comparative Examples 2.1 to 2.5, after the application of the ink to the printing medium, air was blown to dry the first film, and then the ultraviolet light was applied.

<Evaluation (2.1)>

The mass of the first film on the printing medium at an ultraviolet light application position was measured under a state in which the ultraviolet light was not applied. It was recognized that in each of Examples and Comparative Examples, the polymerizable component A did not precipitate, and was hence in the state of being dissolved in the first film. Next, the first film was completely dried with an oven, and the moisture concentration "x" was measured and calculated from its reduced mass. Comparison between the masses of the first film before and after the complete drying with the oven showed that the moisture concentration "x" of the first film when the first film was not dried before the ultraviolet light application (Examples 2.1, 2.2, and 2.5, and Comparative Examples 2.6 and 2.7) was the same as the moisture concentration of the used ink. Accordingly, the moisture concentration "x" of the first film formed in each of Examples 2.1, 2.2, and 2.5, and Comparative Examples 2.6 and 2.7 was set to the moisture concentration of the used ink. The results are shown in Table 2.2.

Next, the second film was placed in a test chamber corresponding to an environment at 23° C. and a humidity of 95% RH, and was left to stand for 3 days. The mass of the second film after the standing was measured, and the value of the ratio "y/x" was calculated. The results are shown in Table 2.2.

(Complex Modulus of Elasticity)

The complex modulus of elasticity of the second film (cured product after the ultraviolet light application) thus formed was measured with a rheometer (product name: "MCR302", manufactured by Anton Paar GmbH). The results are shown in Table 2.2.

(Porosity)

Figure 6:
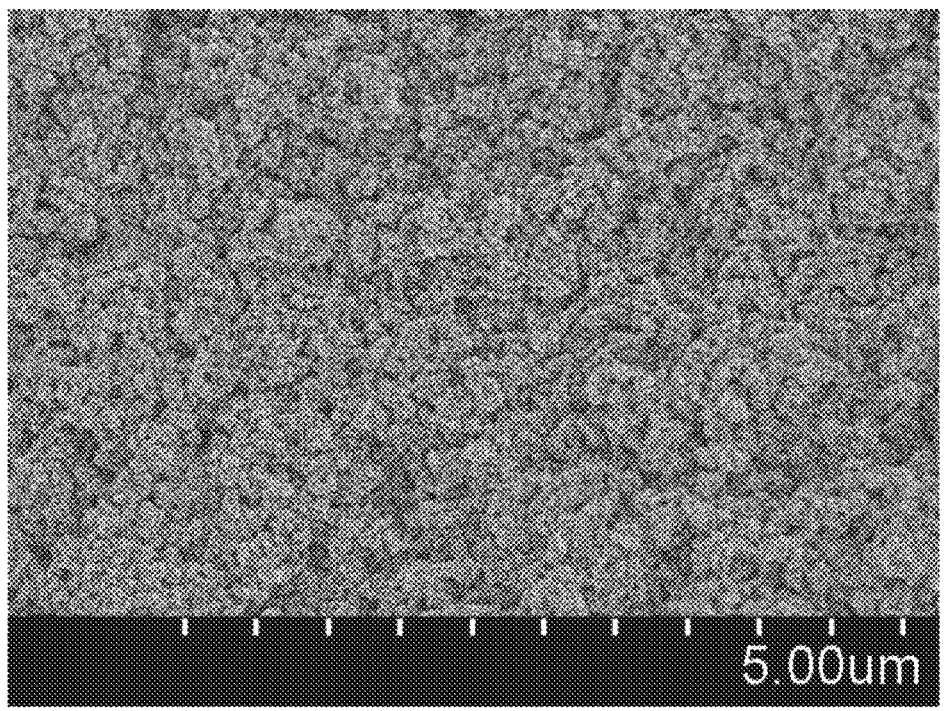
FIG. 6 is a SEM photograph of a post-drying porous body formed in Example 2.5.

The second film immediately after the formation is defined as the second film "at the time of non-drying," and the second film 3 hours after the formation is defined as the second film "after drying." The second films at the time of the non-drying and after the drying were observed with an electron microscope, and whether or not a porous structure was formed was recognized. For the second film at the time of the non-drying, an approach that was so called cryo-SEM, the approach including quickly freezing the film with liquid nitrogen, was used. A case in which a porous structure was observed was indicated by the term "Porous", and a case in which no porous structure was observed was indicated by the term "Uniform". The results are shown in Table 2.2. A SEM photograph of the post-drying porous body formed in Example 2.5 is shown in FIG. 6.

(Whiteness)

In addition, each of the second films at the time of the non-drying and after the drying was visually observed, and was evaluated for whiteness. The results are shown in Table 2.2.

TABLE 2-2

| | | x (%) | y/x | Lower critical solution temperature | Complex modulus of elasticity (Pa) | At time of non-drying | | After drying | |
|---|---|---|---|---|---|---|---|---|---|
| | Ink | | | | | Porosity | Whiteness | Porosity | Whiteness |
| Example 2-1 | Ink 2-1 | 90 | 0.53 | Present | $10^{6.8}$ | Porous | White | Porous | White |
| Example 2-2 | Ink 2-2 | 80 | 0.50 | Present | $10^{7.1}$ | Porous | White | Porous | White |
| Example 2-3 | Ink 2-2 | 60 | 0.55 | Present | $10^{7.3}$ | Porous | White | Porous | White |
| Example 2-4 | Ink 2-2 | 50 | 0.62 | Present | $10^{7.4}$ | Porous | White | Porous | White |
| Comparative Example 2-1 | Ink 2-2 | 40 | 0.83 | Present | $10^{7.5}$ | Uniform | Milky white | Uniform | Milky white |
| Comparative Example 2-2 | Ink 2-2 | 20 | 1.11 | Present | $10^{7.5}$ | Uniform | Transparent | Uniform | Transparent |
| Example 2-5 | Ink 2-3 | 90 | 0.57 | Absent | $10^{7.1}$ | Porous | White | Porous | White |
| Example 2-6 | Ink 2-4 | 80 | 0.64 | Absent | $10^{7.5}$ | Porous | White | Porous | White |
| Example 2-7 | Ink 2-5 | 70 | 0.71 | Absent | $10^{7.6}$ | Porous | White | Porous | White |
| Comparative Example 2-3 | Ink 2-5 | 60 | 0.90 | Absent | $10^{7.7}$ | Uniform | Milky white | Uniform | Milky white |
| Comparative Example 2-4 | Ink 2-5 | 40 | 1.08 | Absent | $10^{7.7}$ | Uniform | Milky white | Uniform | Milky white |
| Comparative Example 2-5 | Ink 2-5 | 20 | 1.17 | Absent | $10^{7.7}$ | Uniform | Transparent | Uniform | Transparent |
| Example 2-8 | Ink 2-6 | 80 | 0.44 | Present | $10^{6.1}$ | Porous | White | Uniform | White |
| Comparative Example 2-6 | Ink 2-7 | 80 | 0.93 | Absent | $10^{6.0}$ | Uniform | Milky white | Uniform | White |
| Comparative Example 2-7 | Ink 2-8 | 80 | 0.95 | Absent | $10^{5.5}$ | Uniform | Transparent | Uniform | White |

<Porous Body Production (2.2) and Evaluation (2.2)>

Example 2.6

A medium in which a porous film having a thickness of 4 μm was formed on the printing medium (PET film) was obtained in the same manner as in Example 2.3 described above except that the amount of the ink to be applied to the printing medium was set to 6 g/m². Lowercase alphabets (black letters) from "a" to "z" each having a size of 5 pt were printed on the resultant medium with an ink jet printing apparatus (product name: "Pro-10", manufactured by Canon Inc.) by one pass. As a result, the ink was absorbed by the porous layer, and hence clear letters free of blurs were able to be printed.

Comparative Example 2.8

A clear ink having a concentration of 30 mass % was prepared by using the polymerizable component A-5. Then, a transparent layer having a thickness of 4 μm was formed in the same manner as in Example 2.7 described above except that: the prepared clear ink was used; and its application amount was set to 12 g/m². Thus, a medium was obtained. Printing was performed on the resultant medium in the same manner as in the case of Example 2.7 described above. As a result, the ink was hardly absorbed by the transparent layer, and hence the letters blurred. In addition, the letters were legible, but collapsed to a large extent.

Comparative Example 2.9

A transparent layer having a thickness of 4 μm was formed on the PET film with a UV ink jet apparatus (product name: "UCJV300-107", manufactured by Mimaki Engineering Co., Ltd.) and a clear ink (product name: "LUS-170", manufactured by Mimaki Engineering Co., Ltd.) for the apparatus at 1,200 dpi to provide a medium. Lowercase alphabets (black letters) from "a" to "z" each having a size of 5 pt were printed on the resultant medium by one pass. As a result, the ink was not absorbed by the transparent layer, and hence the letters blurred and were illegible.

According to one aspect of the present invention, there can be provided the ink jet printing method, in which the active energy ray-curable aqueous ink is used, moisture is easily removed from a cured product thereof and a printed product to be obtained hardly curls, and even when inks of a plurality of colors are used, bleeding hardly occurs. Further, according to one aspect of the present invention, there can be provided the ink jet printing apparatus to be used in the ink jet printing method.

In addition, according to another aspect of the present invention, there can be provided the method of producing a porous body and the apparatus for producing a porous body each enabling on-demand production of a porous body having a desired free shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ink jet printing method comprising:
   a first step of ejecting an ink containing a water-soluble polymerizable component A and water from a printing head of an ink jet system to apply the ink to a medium M, to thereby form a first image; and
   a second step of applying an active energy ray to the first image to form a second image,
   wherein the polymerizable component A is dissolved in the first image,
   wherein a moisture concentration "x" (mass %) in the first image and a moisture concentration "y" (mass %) in the second image placed under an environment at a humidity of 95% satisfy a relationship of $0<(y/x)\leq 0.80$, and
   wherein the polymerizable component A has a lower critical solution temperature in the water.

2. The ink jet printing method according to claim 1, wherein the second step of applying the active energy ray to the first image is performed without through drying of the first image by at least one of heating or air blowing.

3. The ink jet printing method according to claim 1, wherein the moisture concentration "x" (mass %) is 50 mass % or more.

4. The ink jet printing method according to claim 1, further comprising a third step of removing at least part of moisture from the second image to form a third image.

5. The ink jet printing method according to claim 4, wherein the third step of removing at least part of the moisture from the second image is performed by bringing a liquid absorbing body into contact with the second image.

6. The ink jet printing method according to claim 4, further comprising a fourth step of transferring the third image from the medium M onto a medium N to form a fourth image on the medium N.

7. The ink jet printing method according to claim 1, wherein the second image is formed of a solid content having a complex modulus of elasticity of less than $10^{7.0}$ Pa.

8. The ink jet printing method according to claim 1, wherein the polymerizable component A includes an acrylamide structure.

9. The ink jet printing method according to claim 1, wherein the polymerizable component A has a molecular weight of 800 or less.

10. The ink jet printing method according to claim 1, wherein a moisture concentration "z" (mass %) at the lower critical solution temperature of the polymerizable component A and the moisture concentration "x" (mass %) in the first image satisfy a relationship of $x \geq z$.

11. The ink jet printing method according to claim 1, wherein the polymerizable component A has a plurality of polymerizable functional groups in a molecule thereof.

12. The ink jet printing method according to claim 11, wherein the polymerizable component A satisfies a relationship of "molecular weight/number of polymerizable functional groups≤150".

13. An ink jet printing apparatus comprising:
    a unit configured to perform a first step of ejecting an ink containing a water-soluble polymerizable component A and water from a printing head of an ink jet system to apply the ink to a medium M, to thereby form a first image; and
    a unit configured to perform a second step of applying an active energy ray to the first image to form a second image,
    wherein the polymerizable component A is dissolved in the first image,
    wherein a moisture concentration "x" (mass %) in the first image and a moisture concentration "y" (mass %) in the second image placed under an environment at a humidity of 95% satisfy a relationship of $0<(y/x)\leq 0.80$, and
    wherein the polymerizable component A has a lower critical solution temperature in the water.

14. A method of producing a porous body comprising:
    a first step of ejecting a liquid composition containing a water-soluble polymerizable component A and water from a printing head of an ink jet system to apply the liquid composition to a medium M, to thereby form a first film; and
    a second step of applying an active energy ray to the first film to form a second film having a porous structure,
    wherein the polymerizable component A is dissolved in the first film,
    wherein a moisture concentration "x" in the first film and a moisture concentration "y" in the second film placed under an environment at a humidity of 95% satisfy a relationship of $0<(y/x)\leq 0.80$, and
    wherein the polymerizable component A has a lower critical solution temperature in the water.

15. The method of producing a porous body according to claim 14, wherein the second film is formed of a solid content having a complex modulus of elasticity of $10^{7.0}$ Pa or more.

16. The method of producing a porous body according to claim 14, wherein the liquid composition is free of a colorant.

17. The method of producing a porous body according to claim 14, further comprising a third step of drying the second film to form a third film having a porous structure from which the water has been removed.

18. The method of producing a porous body according to claim 17, wherein the third film is white.

19. The method of producing a porous body according to claim 17, wherein the third film is capable of absorbing an ink.

20. An apparatus for producing a porous body comprising:

a unit configured to perform a first step of ejecting a liquid composition containing a water-soluble polymerizable component A and water from a printing head of an ink jet system to apply the liquid composition to a medium M, to thereby form a first film; and a unit configured to perform a second step of applying an active energy ray to the first film to form a second film having a porous structure, wherein the polymerizable component A is dissolved in the first film, wherein a moisture concentration "x" in the first film and a moisture concentration "y" in the second film placed under an environment at a humidity of 95% satisfy a relationship of $0<(y/x)\leq 0.80$, and wherein the polymerizable component A has a lower critical solution temperature in the water.

21. The ink jet printing method according to claim 1, wherein the medium M is a printing medium.

* * * * *